United States Patent
Kawashima et al.

(10) Patent No.: US 6,851,258 B2
(45) Date of Patent: Feb. 8, 2005

(54) REGENERATION OF PARTICULATE FILTER

(75) Inventors: Junichi Kawashima, Yokosuka (JP);
Naoya Tsutsumoto, Yokohama (JP);
Munehiro Tabata, Isehara (JP);
Makoto Otake, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 63 days.

(21) Appl. No.: 10/452,378

(22) Filed: Jun. 3, 2003

(65) Prior Publication Data

US 2004/0000139 A1 Jan. 1, 2004

(30) Foreign Application Priority Data

Jun. 28, 2002 (JP) ........................................ 2002-189206

(51) Int. Cl.[7] .............................................. F01N 3/02
(52) U.S. Cl. .............................. 60/311; 60/274; 60/285; 60/295
(58) Field of Search .......................... 60/274, 285, 295, 60/297, 300, 311

(56) References Cited

U.S. PATENT DOCUMENTS

| | | | |
|---|---|---|---|
| 4,835,963 A | * | 6/1989 | Hardy .......................... 60/274 |
| 4,835,964 A | * | 6/1989 | Kume et al. .................... 60/285 |
| 5,195,316 A | * | 3/1993 | Shinzawa et al. ............... 60/274 |
| 5,287,698 A | * | 2/1994 | Shinzawa et al. ............... 60/286 |
| 5,319,930 A | * | 6/1994 | Shinzawa et al. ............... 60/286 |
| 5,716,586 A | * | 2/1998 | Taniguchi ..................... 422/173 |
| 6,405,528 B1 | * | 6/2002 | Christen et al. ................ 60/295 |
| 6,438,948 B2 | * | 8/2002 | Ono et al. ..................... 60/311 |

FOREIGN PATENT DOCUMENTS

JP 2000-179326 A 6/2000

* cited by examiner

Primary Examiner—Thomas Denion
Assistant Examiner—Diem Tran
(74) Attorney, Agent, or Firm—Foley & Lardner LLP

(57) ABSTRACT

An exhaust passage (2) of a diesel engine (1) is provided with a filter (41) for trapping particulate matter. Regeneration of the filter (41) is divided into first to third phases. In the first phase the filter temperature is raised to the combustion temperature of the particulate matter in a short period of time through control of the exhaust gas temperature. In the second phase, the oxygen concentration of the exhaust gas is held at a predetermined low level while the filter temperature is maintained so as to prevent excessive combustion of particulate matter. In the third phase, wherein the amount of trapped particulate matter has been reduced, the oxygen concentration of the exhaust gas is held at a predetermined high level while the filter temperature is maintained so as to complete the combustion of the trapped particulate matter.

32 Claims, 16 Drawing Sheets

FIRST PHASE

SECOND (THIRD) PHASE

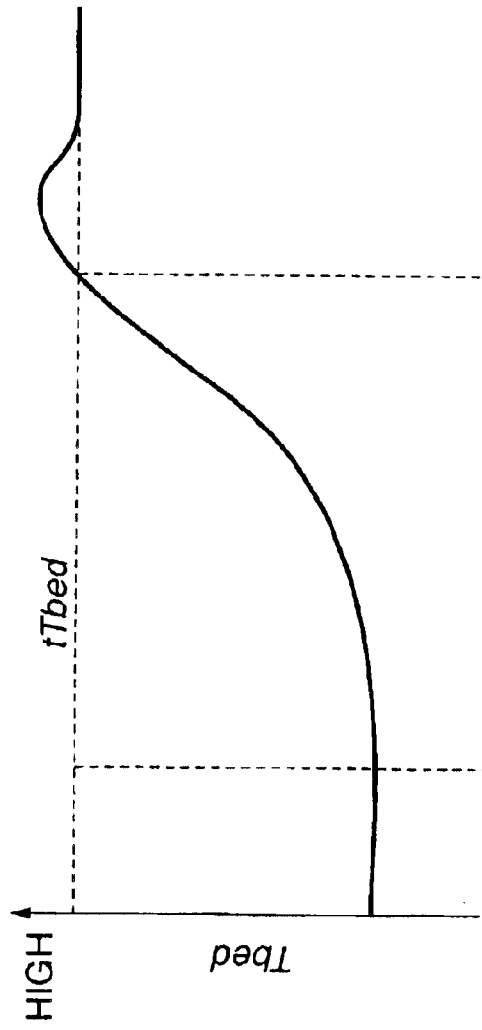
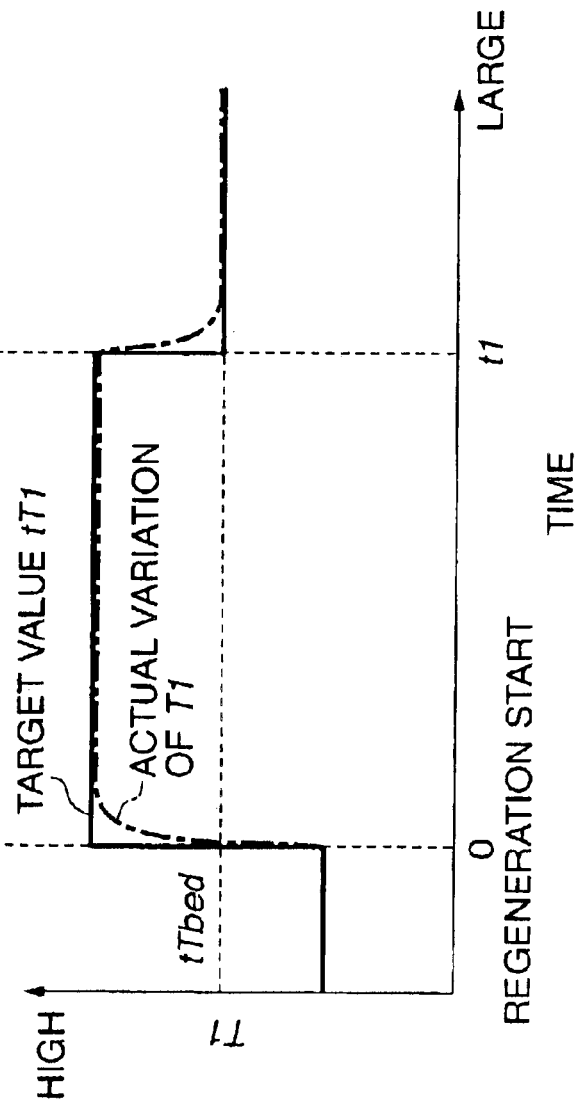
FIG.12A
FIG.12B

REGENERATION OF PARTICULATE FILTER

FIELD OF THE INVENTION

This invention relates to the regeneration of a diesel particulate filter for trapping particulate matter contained in engine exhaust gas.

BACKGROUND OF THE INVENTION

JP2000-179326A, published by the Japanese Patent Office in 2000, discloses a regeneration method for a diesel particulate filter (DPF) which traps particulate matter contained in the exhaust gas of a diesel engine. In this method, when the amount of particulate matter trapped in the filter reaches a predetermined amount, the filter temperature is raised to the self-ignition temperature of the particulate matter, whereby the trapped particulate matter is burned and thus the particulate matter is removed from the filter. As a result, the DPF is returned to a state in which particulate matter may be trapped.

The filter temperature is raised by raising the exhaust gas temperature, which is performed by controlling the fuel injection amount and injection timing of the engine. When the temperature of the filter rises to the self-ignition temperature of the particulate matter, the particulate matter burns through self-ignition and is thus removed from the filter.

SUMMARY OF THE INVENTION

In filter regeneration, it is preferable to reduce the period of filter temperature increase in order to economize on the fuel which is consumed during the temperature increase period. It is also necessary to appropriately control the combustion rate following the beginning of particulate matter combustion in order to prevent deterioration of the filter caused by excessive rises in the temperature of the filter bed due to particulate matter combustion.

In regeneration devices according to the prior art, increases in the filter temperature become faster when attempts are made to shorten the temperature increase period, and thus the temperature of the filter bed rises excessively at the particulate matter combustion stage. On the other hand, if attempts are made to suppress temperature increase in the filter bed at the particulate matter combustion stage, a large amount of time is required for the filter temperature to rise.

It is therefore an object of this invention to shorten the amount of time required to raise the filter temperature while suppressing temperature increase in the filter bed caused by particulate matter combustion.

Further, if a part of the particulate matter remains in the filter upon completion of regeneration processing, pressure loss in the filter increases, causing an increase in fuel consumption during subsequent engine operations. Moreover, the residual particulate matter in the filter causes bias in the distribution of particulate matter trapped by the filter when the filter subsequently traps particulate matter. This bias leads to bias in the combustion temperature during subsequent filter regeneration processing, thereby causing damage to the durability of the filter. Hence during filter regeneration, particulate matter must be completely burned.

It is therefore a further object of this invention to prevent the residual particulate matter from remaining in the filter upon the completion of filter regeneration.

In order to achieve the above objects, this invention provides a regeneration device for a filter which traps particulate matter contained in the exhaust gas of an internal combustion engine, wherein the particulate matter burns at a predetermined temperature. The regeneration device comprises an exhaust gas temperature adjustment mechanism which regulates a temperature of the exhaust gas, an exhaust gas oxygen concentration adjustment mechanism which regulates an oxygen concentration of the exhaust gas, a sensor which detects a temperature of the filter, and a controller.

The controller functions to control the exhaust gas temperature adjustment mechanism in a first phase such that the exhaust gas temperature is raised until the temperature of the filter rises to a predetermined temperature, control the exhaust gas oxygen concentration adjustment mechanism in a second phase following the first phase to cause the oxygen concentration of the exhaust gas to be held at a first target concentration while controlling the exhaust gas temperature adjustment mechanism to cause the temperature of the filter to be maintained at the predetermined temperature, and control the exhaust gas oxygen concentration adjustment mechanism in a third phase following the second phase to cause the oxygen concentration of the exhaust gas to be held at a second target concentration which is higher than the first target concentration while controlling the exhaust gas temperature adjustment mechanism to cause the temperature of the filter to be maintained at the predetermined temperature.

This invention also provides a regeneration method for a filter which traps particulate matter contained in the exhaust gas of an internal combustion engine, wherein the particulate matter burns at a predetermined temperature, and the engine comprises an exhaust gas temperature adjustment mechanism which regulates a temperature of the exhaust gas, an exhaust gas oxygen concentration adjustment mechanism which regulates an oxygen concentration of the exhaust gas and a sensor which detects a temperature of the filter.

The method comprises controlling the exhaust gas temperature adjustment mechanism in a first phase such that the exhaust gas temperature is raised until the temperature of the filter rises to a predetermined temperature, controlling the exhaust gas oxygen concentration adjustment mechanism in a second phase following the first phase to cause the oxygen concentration of the exhaust gas to be held at a first target concentration while controlling the exhaust gas temperature adjustment mechanism to cause the temperature of the filter to be maintained at the predetermined temperature, and controlling the exhaust gas oxygen concentration adjustment mechanism in a third phase following the second phase to cause the oxygen concentration of the exhaust gas to be held at a second target concentration which is higher than the first target concentration while controlling the exhaust gas temperature adjustment mechanism to cause the temperature of the filter to be maintained at the predetermined temperature.

The details as well as other features and advantages of this invention are set forth in the remainder of the specification and are shown in the accompanying drawings.

BRIEF DESCRIPTION OF THE DRAWINGS

FIGS. 12A and 12B are timing charts illustrating temperature change in a filter inlet and the filter bed during regeneration processing.

DESCRIPTION OF THE PREFERRED EMBODIMENTS

Figure 1:
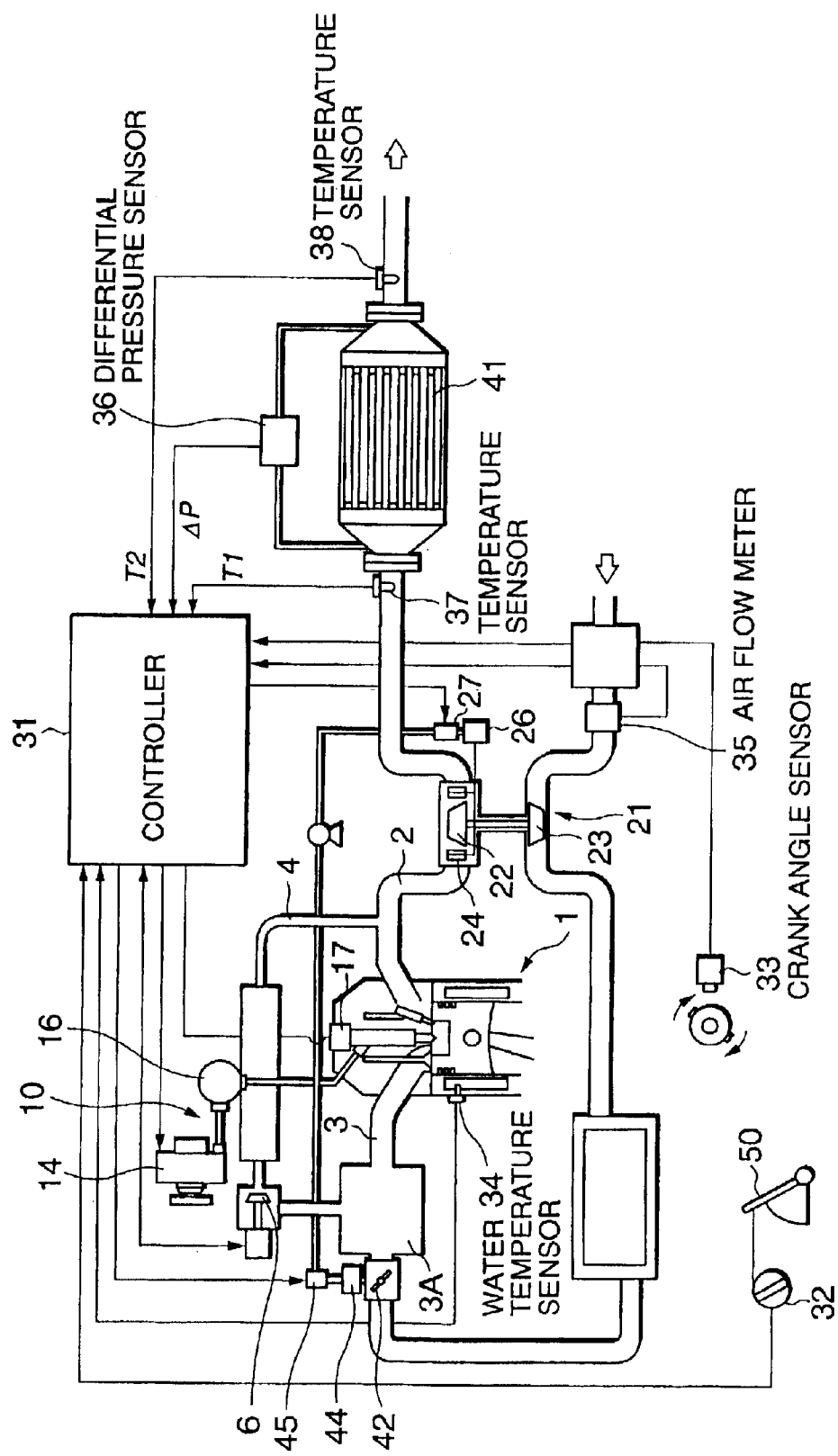
FIG. 1 is a schematic diagram of a diesel engine comprising an exhaust gas purification device according to this invention.

Referring to FIG. 1 of the drawings, a multi-cylinder diesel engine 1 for use in a vehicle comprises an exhaust passage 2 and an intake passage 3. An exhaust gas recirculation passage (EGR passage) 4 for recirculating a part of the exhaust gas in the exhaust passage 2 is connected to a collector 3A of the intake passage 3. The EGR passage 4 is provided with a diaphragm type exhaust gas recirculation valve (EGR valve) 6. The exhaust gas recirculation valve (EGR valve) 6 opens in accordance with a signal from a controller 31 to thereby alter the exhaust gas recirculation rate.

Fuel supply to the diesel engine 1 is performed by a common rail type fuel injection device 10. The fuel injection device 10 comprises a supply pump 14, a common rail 16 for accumulating fuel under a constant pressure, and a fuel injection nozzle 17 provided for each cylinder. The nozzle 17 is installed with a three-way valve. When the three-way valve is switched ON, fuel is injected, and when the three-way valve is switched OFF, fuel injection stops. The fuel injection timing is determined by the timing of the three-way valve switching ON, and the fuel injection amount is determined by the amount of time the three-way valve is switched ON. The three-way valve is operated ON and OFF by a signal output from the controller 31.

An exhaust gas turbine 22 of a variable geometric turbocharger 21 is disposed downstream of the bifurcation point between the exhaust gas passage 2 and the EGR passage 4.

The exhaust gas turbine 22 is coupled to a compressor 23 provided on the intake air passage 3 and serves to pressure charge the intake air in the intake passage 3.

A variable nozzle 24 which is driven by a diaphragm actuator 26 is provided at the exhaust gas inlet to the exhaust gas turbine 22. In a low rotation speed region of the engine 1, the variable nozzle 24 increases the flow rate of the exhaust gas by narrowing the sectional area of exhaust gas influx, and in so doing serves to maintain the boost pressure of the turbocharger 21. The diaphragm actuator 26 increases and decreases the opening of the variable nozzle 24 in accordance with supply pressure from a pressure control valve 27 which is driven in accordance with a signal from the controller 31.

A diesel particulate filter (DPF) 41 for trapping particulate matter in the exhaust gas is provided on the exhaust passage 2 downstream of the exhaust gas turbine 22.

An intake throttle 42 which is driven by a diaphragm actuator 44 is provided in the intake passage 3. The diaphragm actuator 44 increases and decreases the opening of the intake throttle 42 in accordance with supply pressure from the pressure control valve 27 which is driven in accordance with a signal from the controller 31.

As described above, the amount of EGR through the EGR valve 6, the fuel injection timing and fuel injection amount of the fuel injection nozzle 17, and the boost pressure of the turbocharger 21 are controlled by the controller 31. Operations of the supply pump 14 are also controlled by the controller 31.

As parameters for these control operations, detected values from an accelerator depression sensor 32 for detecting the amount of depression of an accelerator pedal 50 comprised in the vehicle, a crank angle sensor 33 for detecting a predetermined rotation position and rotation speed of the diesel engine 1, a water temperature sensor 34 for detecting the temperature of cooling water in the diesel engine 1, an air flow meter 35 for detecting the intake fresh air amount of the diesel engine 1, a differential pressure sensor 36 for detecting pressure loss ΔP through the DPF 41, a temperature sensor 37 for detecting a filter inlet temperature T1 of the DPF 41, and a temperature sensor 38 for detecting an outlet temperature T2 of the DPF 41 are respectively inputted into the controller 31 as signals.

The controller 31 is constituted by a microcomputer comprising a central processing unit (CPU), read-only memory (ROM), random access memory (RAM), and an input/output interface (I/O interface). The controller may be constituted by a plurality of microcomputers.

Next, referring to FIG. 2, regeneration control of the DPF 41 will be described.

In this invention, the period of regeneration processing of the DPF 41 is divided into a time series of three phases, a first phase, a second phase, and a third phase, and different criteria are applied to control of the exhaust gas temperature and the oxygen concentration in the exhaust gas for each phase. The time period of the first phase is set as t1, the time period of the second phase is set as t2, and the time period of the third phase is set as t3.

Next, referring to FIGS. 22A–22D, these criteria will be described.

Figure 22A:
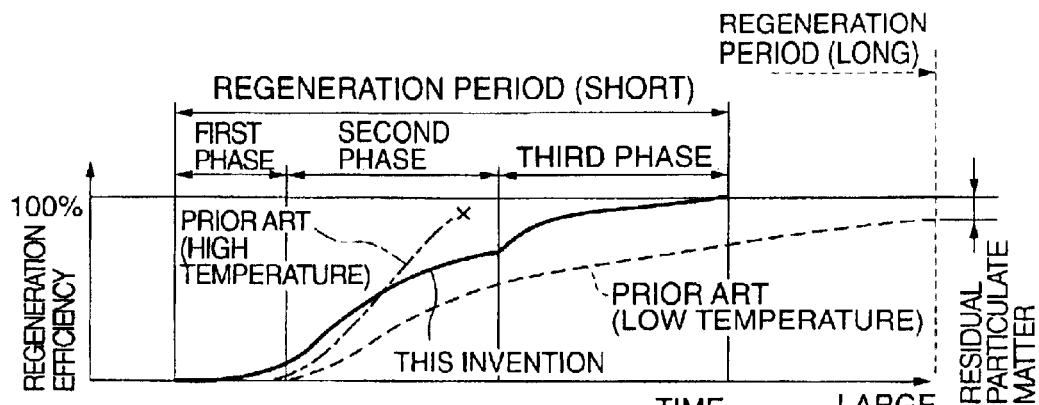
FIGS. 22A–22D are timing charts illustrating change in a filter inlet target temperature, exhaust gas oxygen concentration, filter regeneration efficiency, and maximum filter bed temperature during a filter regeneration period.
Figure 22B:
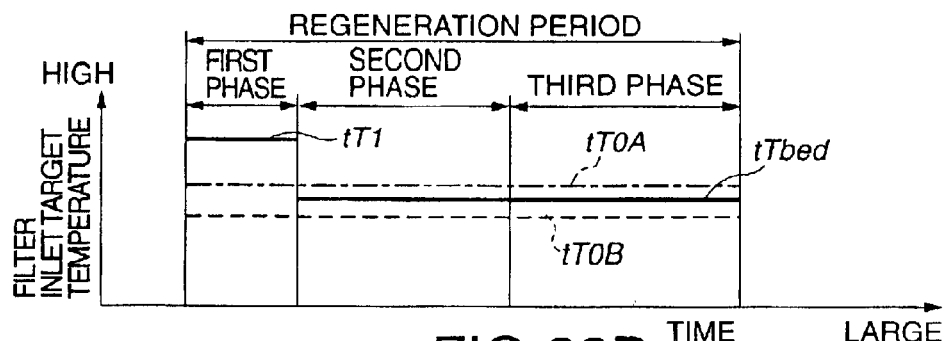

(1) First phase (t1):

In order to increase the temperature of the DPF 41 filter bed to a target bed temperature tTbed for regeneration in a short period of time, a target value tT1 for the filter inlet temperature is set much higher than the target bed temperature tTbed, as shown by the solid line in FIG. 22B, and the filter temperature is raised rapidly toward this target value tT1. The target bed temperature tTbed is the temperature at which particulate matter trapped in the DPF 41 self-ignites and burns rapidly, and is generally a value between 450 and 650 degrees centigrade. Note that target values tT0A, tT0B for the filter inlet temperature in conventional devices are set in the vicinity of the target bed temperature, as shown by the dot/dash line and the broken line in FIG. 22B.

Figure 22C:
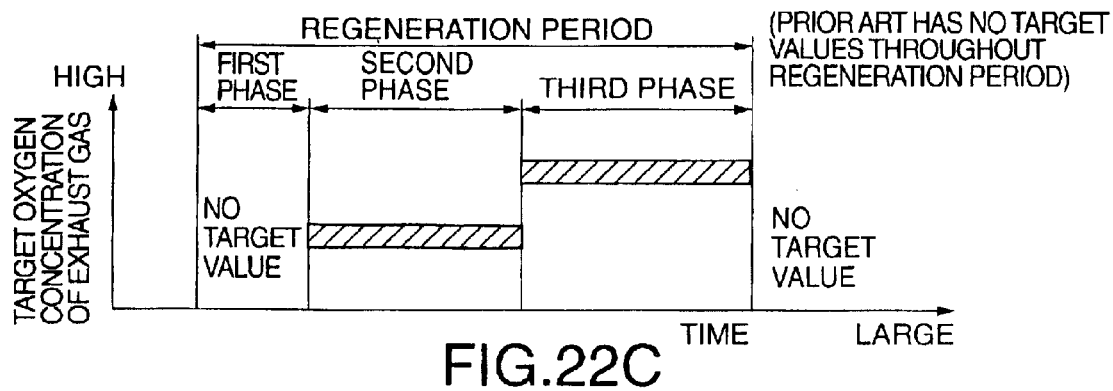
Figure 22D:
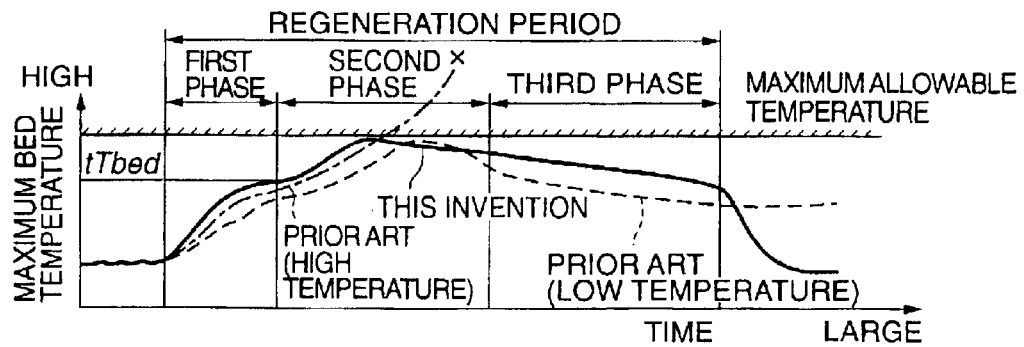

As shown in FIG. 22D, by setting the filter inlet temperature in this manner, the bed temperature of the DPF 41 rises rapidly compared to the conventional devices shown by the dot/dash line and broken line. In the first phase t1, control is executed only to raise the bed temperature, and control of the oxygen concentration in the exhaust gas is not performed. Accordingly no target oxygen concentration is set in the first phase t1, as shown in FIG. 22C. The point in time at which the bed temperature reaches the target bed temperature tTbed is the end timing of the first phase, as shown in FIG. 22D.

(2) Second phase (t2):

In order to suppress the combustion rate of the particulate matter trapped in the DPF 41, a target oxygen concentration in the exhaust gas is set to a low concentration, as shown in FIG. 22C, and the air/fuel ratio of the air/fuel mixture supplied to the diesel engine 1 is controlled such that this low target oxygen concentration is achieved.

The target value tT1 for the filter inlet temperature is switched to the target bed temperature tTbed. The target bed temperature tTbed is reached at the end of the first phase t1, and therefore the target value tT1 is set at the target bed temperature tTbed here in order to maintain the target bed temperature tTbed. If the high temperature target value tT1 of the first phase were maintained, the bed temperature would exceed a maximum allowable temperature Tmax.

By performing air/fuel ratio control on the basis of a low level target oxygen concentration, the particulate matter trapped in the DPF 41 burns gradually.

(3) Third phase (t3):

In order to burn up residual particulate matter in the DPF 41 in the closing stage of regeneration processing, the target oxygen concentration in the exhaust gas is set to a higher concentration than the target oxygen concentration in the second phase t2, as shown in FIG. 22C, and the air/fuel ratio of the air/fuel mixture supplied to the diesel engine 1 is controlled such that the target oxygen concentration is achieved.

As in the second phase t2, the target value tT1 for the filter inlet temperature is maintained at the target bed temperature tTbed.

As shown by the solid line in FIG. 22A, by performing air/fuel ratio control on the basis of a high level target oxygen concentration, the regeneration efficiency of the DPF 41 nears 100%, which is complete regeneration.

In conventional devices, the target value for the filter inlet temperature is fixed, and control of the oxygen concentration is not performed. As regards filter regeneration efficiency in this case, if the target value for the filter inlet temperature is set at a low level, particulate matter ashes remain in the DPF 41 even when regeneration is performed over a long time period, as shown by the broken line in FIG. 22A. If, on the other hand, the target value for the filter inlet temperature is set at a high level, the bed temperature exceeds the maximum allowable temperature Tmax during regeneration, as shown by the dot/dash line in FIG. 22D.

Various routines executed by the controller 31 for performing regeneration control of the DPF 41 will now be described.

Figure 3:
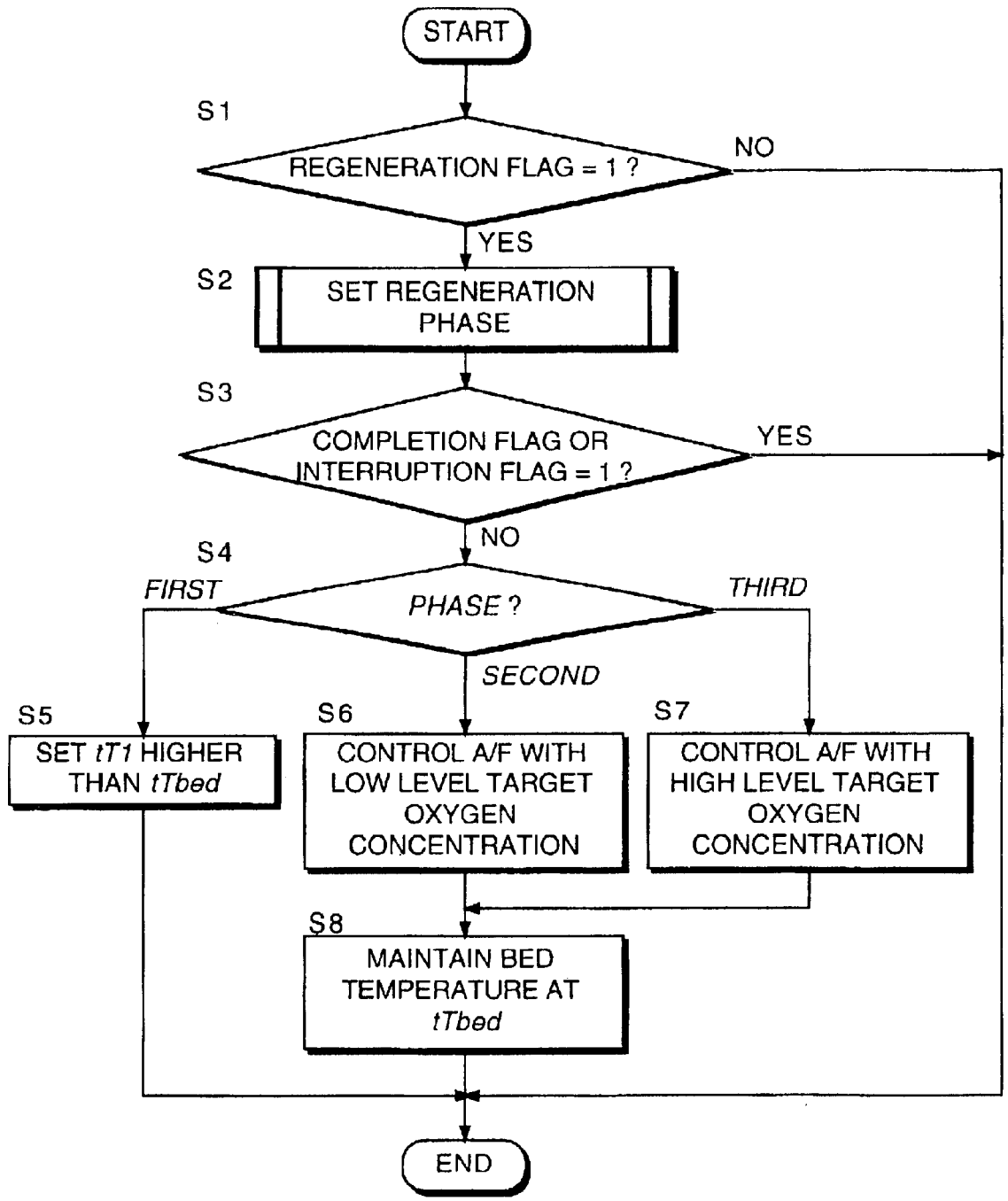
FIG. 3 is a flowchart illustrating a filter regeneration routine executed by a controller according to this invention.

FIG. 3 illustrates a main routine relating to regeneration control of the DPF 41. This routine is executed at intervals of ten milliseconds while the diesel engine 1 is operative.

First, in a step S1, the controller 31 determines whether or not a regeneration flag indicates unity. The regeneration flag takes either a value of unity, which indicates that predetermined regeneration conditions have been satisfied, or a value of zero, which indicates that the regeneration conditions have not been satisfied. Setting of the regeneration flag is performed according to a routine illustrated in FIG. 4, to be described hereinafter.

When the regeneration flag is at zero, the controller 31 immediately ends the routine. When the regeneration flag is at unity, the controller 31 sets a regeneration phase in a step S2 using a subroutine illustrated in FIG. 5.

Figure 5:
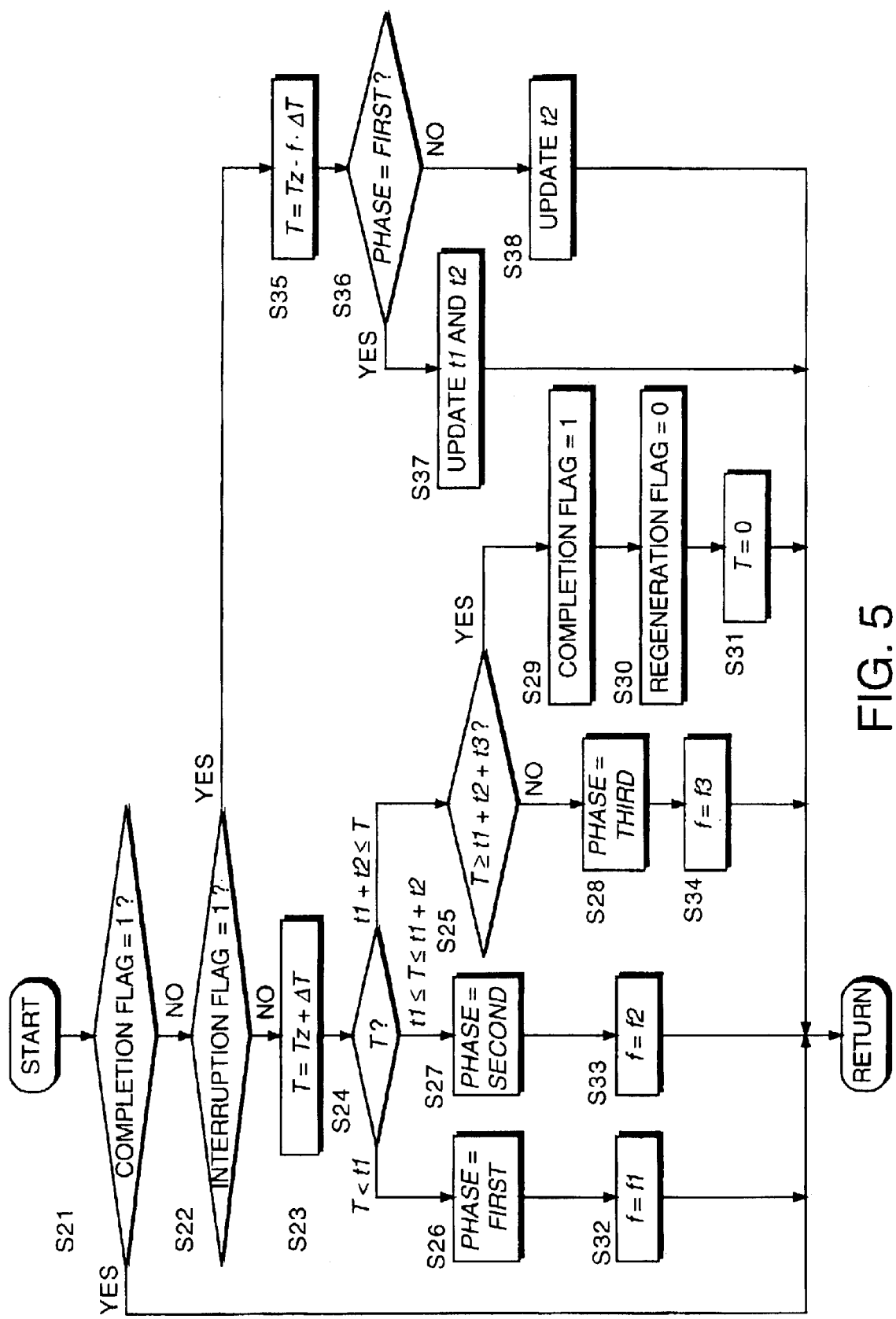
FIG. 5 is a flowchart illustrating a regeneration phase setting routine executed by the controller.

The subroutine in FIG. 5 is a subroutine for determining whether the current point in time corresponds to the aforementioned first phase t1, second phase t2, or third phase t3 from the elapsed time T following the beginning of regeneration processing of the DPF 41.

First, in a step S21, the controller 31 determines whether a completion flag is at unity. The completion flag indicates whether or not regeneration of the DPF 41 is complete, and is set to unity when regeneration is complete and zero when regeneration is not complete. When the completion flag is at unity, the regeneration period is complete, and thus the controller 31 immediately ends the subroutine.

When the completion flag is not at unity, the controller 31 determines whether or not an interruption flag is at unity in a step S22. The interruption flag is set to unity when regeneration conditions are not satisfied following the beginning of regeneration, and is set according to a routine illustrated in FIG. 11, to be described hereinafter. The initial value of both the completion flag and the interruption flag is zero.

If the interruption flag is not at unity in the step S22, the controller 31 updates the elapsed time T from the beginning of regeneration processing of the DPF 41 in a step S23 according to the following equation (1).

$$T = Tz + \Delta T \qquad (1)$$

where, $\Delta T$ = calculation cycle = 10 milliseconds; and
$Tz$ = time elapsed T on the immediately preceding occasion when the subroutine was executed.

Figure 2:
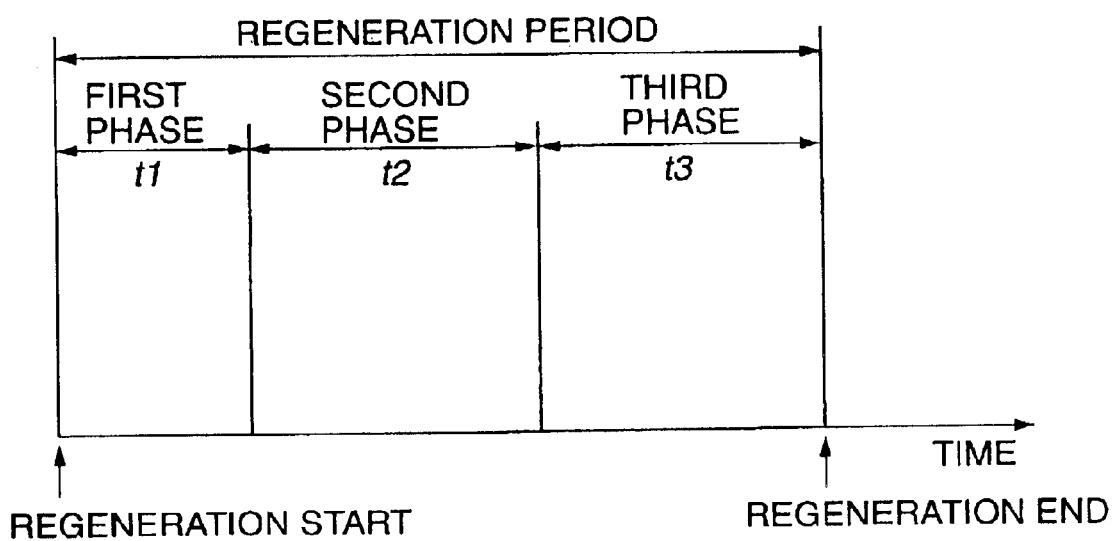
FIG. 2 is a timing chart illustrating three stages relating to particulate filter regeneration processing performed by the exhaust gas purification device.

Next, in a step S24, the controller 31 determines on the basis of the elapsed time T the regeneration phase of FIG. 2 to which the current point in time corresponds.

That is, if the elapsed time T is smaller than t1, a variable PHASE is set to equal FIRST in a step S26, and in a following step S32, a correction coefficient f is set at a predetermined value f1 to thereby end the subroutine. When the variable PHASE equals FIRST, the first phase is indicated. The correction coefficient f is used for correcting the elapsed time T when regeneration is interrupted following the beginning of regeneration of the DPF 41.

If, as a result of the determination in the step S24, the elapsed time T is not smaller than t1 and smaller than t1+t2, the controller 31 sets the variable PHASE to equal SECOND in a step S27, and in a following step S33 sets the correction coefficient f to a predetermined value f2 to thereby end the subroutine. When the variable PHASE equals SECOND, the second phase is indicated.

If, as a result of the determination in the step S24, the elapsed time T is not smaller than t1+t2, a determination is made in a step S25 as to whether or not the elapsed time T has reached t1+t2+t3. If the elapsed time T has not reached t1+t2+t3, the variable PHASE is set to equal THIRD in a step S28, and in a following step S34 the correction coefficient f is set to a predetermined value f3 to thereby end the routine. When the variable PHASE equals THIRD, the third phase is indicated.

The predetermined values f1, f2, f3 will be described in detail hereinafter.

If the elapsed time T has reached t1+t2+t3 in the step S25, the controller 31 sets the completion flag to unity in a step S29, then sets the regeneration flag to zero in a following step S30, and in a following step S31 clears the elapsed time T to zero to thereby end the subroutine. In such a case, this subroutine is substantially not executed again until filter regeneration is executed in the future.

Next, the time period t1 of the first phase, the time period t2 of the second phase, and the time period t3 of the third phase, which are used in the determination of the step S24, will be described. These time periods t1-t3 may be set as fixed values, but here only the time period t3 is set as a fixed value and the time periods t1 and t2 are variable values which are set in the following manner.

Figure 6:
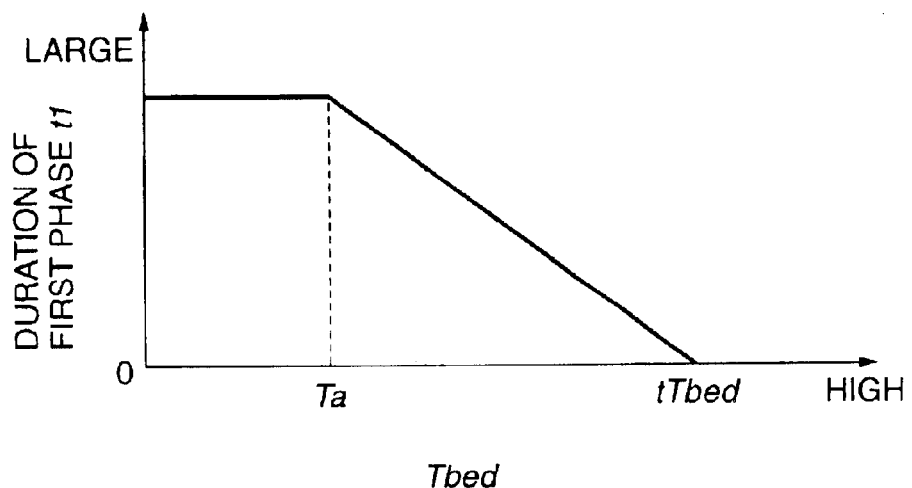
FIG. 6 is a diagram illustrating the characteristic of a map of a first phase time period t1 which is stored in the controller.

FIG. 6 illustrates the relationship between the bed temperature Tbed of the DPF 41 at the start of regeneration and the first phase time period t1. In order to regenerate the DPF 41, the filter temperature must be increased to the target bed temperature tTbed which is a temperature at which particulate matter trapped in the DPF 41 burns through self-ignition. As described above, the first phase time period t1 corresponds to a time period from the beginning of regeneration of the DPF 41 to the point at which the inlet temperature reaches the target bed temperature tTbed.

As shown in the drawing, the time period t1 decreases as the bed temperature Tbed at the start of regeneration increases. This is because the amount of time required to raise the bed temperature to the target bed temperature tTbed decreases as the bed temperature Tbed at the start of regeneration increases. If the bed temperature Tbed at the start of regeneration is higher than the target bed temperature tTbed, then the inlet temperature does not have to be raised, and thus the first phase time period t1 becomes zero. If the bed temperature Tbed at the start of regeneration is lower than a predetermined temperature Ta, then the first phase time period t1 becomes a fixed value. If the bed temperature Tbed at the start of regeneration is too low, then the bed temperature cannot be raised to the target bed temperature tTbed by the heat of the exhaust gas, and thus an upper limit is placed on the time period t1.

Here, the bed temperature Tbed at the start of regeneration on the abscissa is calculated on the basis of a detected temperature T1 of the temperature sensor 37 and a detected temperature T2 of the temperature sensor 38 according to the following equation (2). The bed temperature Tbed when regeneration is restarted following an interruption is included in the bed temperature Tbed at the start of regeneration.

$$Tbed = b1 T1 + b2 T2 \qquad (2)$$

where, b1, b2=constants determined experientially.

Figure 7:
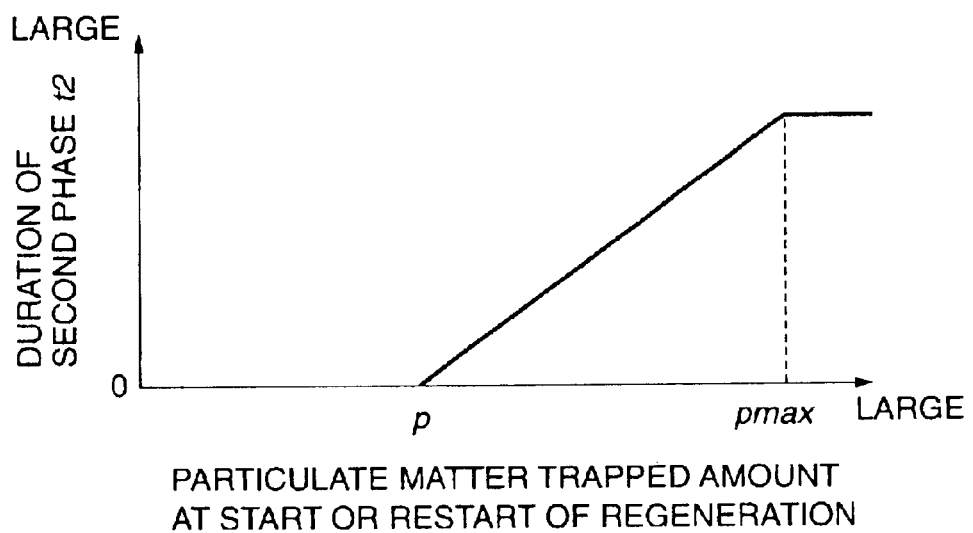
FIG. 7 is a diagram illustrating the characteristic of a map of a second phase time period t2 which is stored in the controller.

FIG. 7 shows the relationship between the amount of trapped particulate matter at the start of regeneration of the DPF 41 and the second phase time period t2. When the bed temperature of the DPF 41 rises to the target bed temperature tTbed, the particulate matter trapped in the DPF 41 burns through self-ignition. If the oxygen concentration in the exhaust gas is sufficiently large in this case, or in other words if the air/fuel ratio of the air/fuel mixture is a predetermined value A corresponding to a lean air/fuel ratio, the particulate matter trapped in the DPF 41 burns rapidly and in large amounts such that the bed temperature Tbed rises above the maximum allowable temperature Tmax, causing thermal degradation of the DPF 41.

Hence by controlling the air/fuel ratio to a predetermined value B which is nearer to stoichiometric air/fuel ratio than the predetermined value A, the particulate matter is caused to burn gradually and the bed temperature Tbed is prevented from exceeding the maximum allowable temperature Tmax. In the second phase, the controller 31 maintains the air/fuel ratio of the diesel engine 1 at this predetermined value B. As shown in the drawing, the second phase time period t2 takes a different value according to the amount of trapped particulate matter at the start or the restart of regeneration. In this drawing, when the amount of trapped particulate matter exceeds a maximum amount of accumulated particulate matter pmax, the time period t2 becomes fixed.

When the amount of trapped particulate matter is equal to or less than a predetermined amount p, the time period t2 becomes zero. When the time period t2 is zero, this means that processing moves suddenly from the first phase to the third phase. The difference between the second phase and third phase is the difference in oxygen concentration in the exhaust gas, but if the amount of trapped particulate matter is small, the bed temperature Tbed does not exceed the maximum allowable temperature Tmax even if the oxygen concentration in the exhaust gas is increased.

As will be described below, regeneration of the DPF 41 is not performed unless the amount of trapped particulate matter equals or exceeds a predetermined amount, and therefore the amount of trapped particulate matter is never below the predetermined amount p at the start of regeneration. When regeneration processing is restarted following an interruption, however, the amount of trapped particulate matter may be below the predetermined amount p at the restart of regeneration.

In such a case, the processing of the third phase is performed omitting the processing of the second phase. The amount of trapped particulate matter at the start of regeneration shown on the abscissa of FIG. 7 includes the amount of trapped particulate matter at the restart of regeneration following an interruption.

The predetermined amount p is determined by the relationship between the amount of trapped particulate matter at the start of third phase control and the rate of increase in the bed temperature of the filter. In other words, the predetermined amount p is set to a maximum trapped amount within the range of a condition according to which the filter bed temperature does not reach the maximum allowable temperature Tmax when third phase control is performed with the amount of trapped particulate matter below the predetermined amount p.

Figure 8:
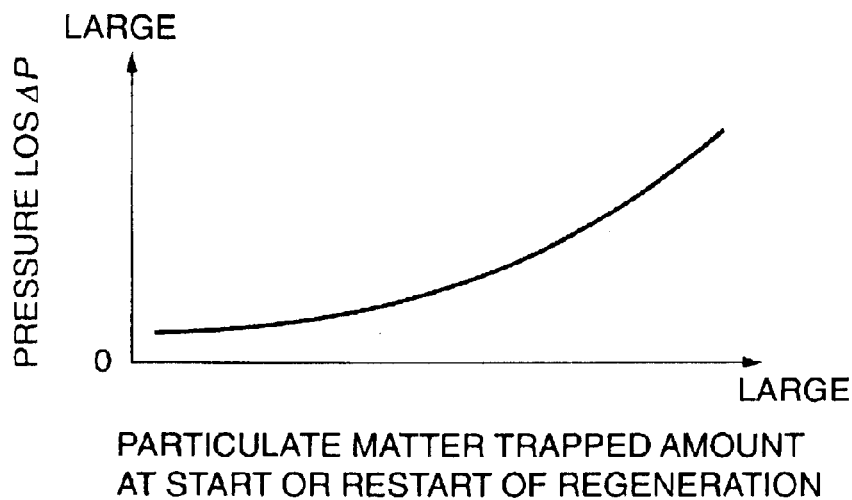
FIG. 8 is a diagram illustrating the characteristic of a map of the amount of trapped particulate matter which is stored in the controller.

The amount of trapped particulate matter at the start or restart of regeneration of the DPF 41 may be determined by retrieving a map having a characteristic as shown in FIG. 8 on the basis of pressure loss ΔP detected by the differential pressure sensor 36.

Maps having a characteristic as shown in FIGS. 6–8 are each stored in memory in the controller 31, and upon execution of the subroutine in FIG. 5, the controller 31 retrieves these maps to determine the time periods t1 and t2 of the first phase and second phase. By thus altering the time periods t1 and t2 of the first phase and second phase of regeneration processing in accordance with the bed temperature or amount of trapped particulate matter at the start of regeneration, the efficiency of regeneration processing can be improved and the amount of time required for regeneration processing can be shortened.

Referring again to FIG. 5, when the interruption flag is at unity in the step S22, the controller 31 corrects the elapsed time T from the beginning of regeneration processing in a step S35 according to the following equation (3).

$$T = Tz - f \Delta T \qquad (3)$$

where, f=correction coefficient.

The meaning of the equation (3) is as follows.

Since regeneration processing of the DPF 41 is not performed during an interruption of regeneration processing, the elapsed time T is not updated as a rule. In this exhaust gas purification device, however, the elapsed time T is updated in consideration of changes in the bed temperature during an interruption.

Figure 9:
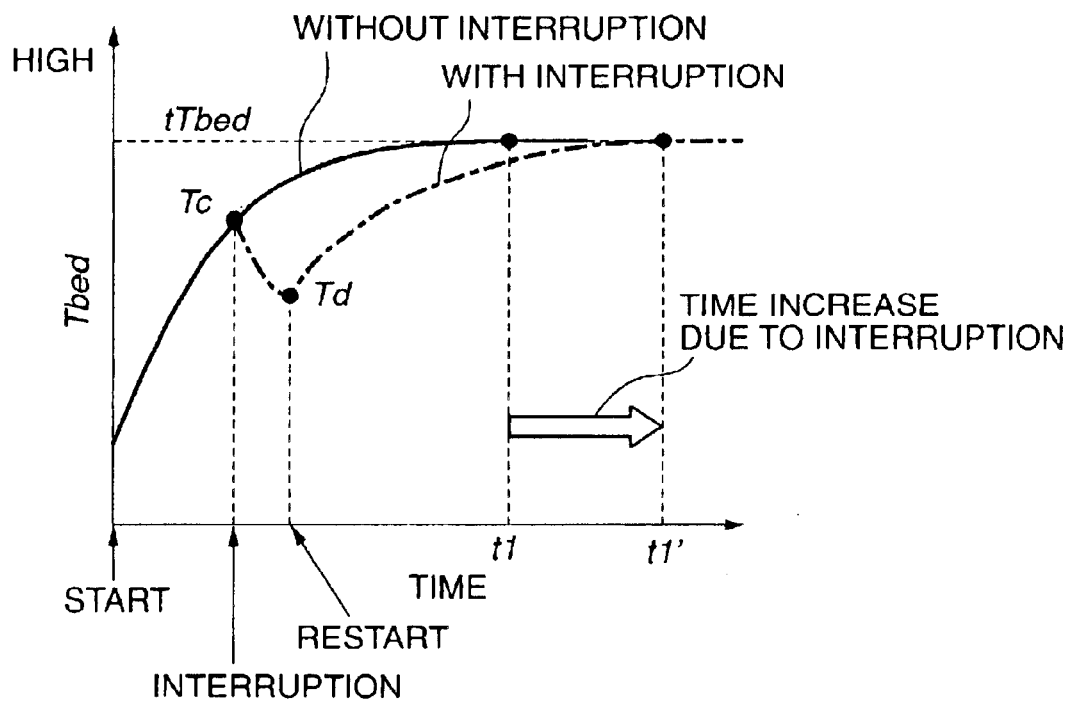
FIG. 9 is a timing chart illustrating temperature change in a filter bed during a particulate filter regeneration processing period.

Referring to FIG. 9, if regeneration processing is not interrupted in the first phase, the bed temperature of the DPF 41 reaches the target bed temperature tTbed at the point when the elapsed time T reaches the first phase time period t1.

As shown by the dot/dash line in the drawing, when regeneration processing is interrupted during the first phase, the bed temperature falls from a temperature Tc at the time of the interruption, and when regeneration processing is restarted, the bed temperature starts to rise again from a temperature Td which is lower than Tc. As a result of the interruption, the amount of time required for the bed temperature to reach the target bed temperature tTbed following a restart increases from t1 to t1'. The correction coefficient f is used to correct this. When regeneration processing is interrupted during the first phase, the interruption time and the elapsed time T are corrected in a decreasing direction by allocating a positive predetermined value f1 to the correction coefficient f.

Figure 10A:
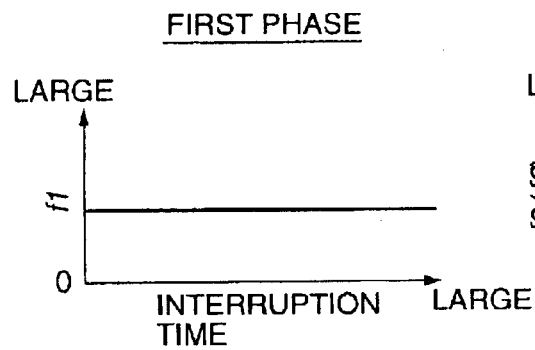
FIGS. 10A–10D are diagrams illustrating change in predetermined values f1–f3 applied by the controller and a timer value T.
Figure 10B:
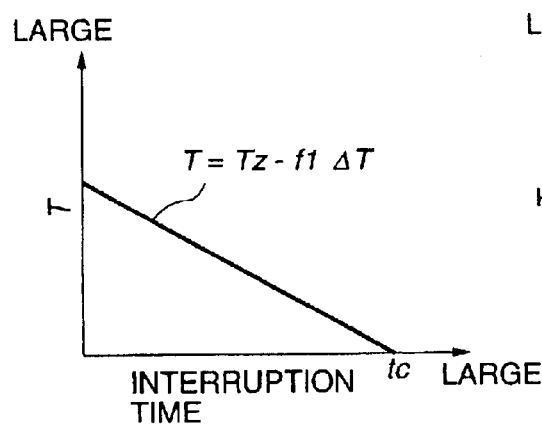

As shown in FIG. 10A, the predetermined value f1 is a positive constant value, and thus the elapsed time T obtained by the equation (3) decreases as the interruption time increases, as shown in FIG. 10B. When the interruption time reaches tc, the elapsed time becomes zero.

When regeneration processing is interrupted in the second phase, on the other hand, the bed temperature is not uniform. In the second phase, the bed temperature of the DPF 41 has reached the target bed temperature tTbed at which particulate matter burns through self-ignition, and the particulate matter continues to burn even when regeneration processing is interrupted. Once the burning has stopped after a while, the bed temperature falls with the elapse of time. This aspect of temperature change is identical to temperature change during an interruption in regeneration processing in the first phase.

Figure 10C:
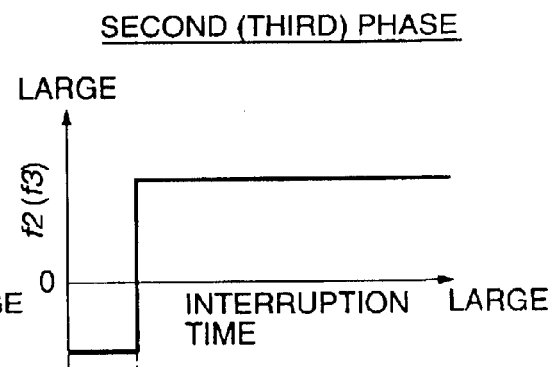
Figure 10D:
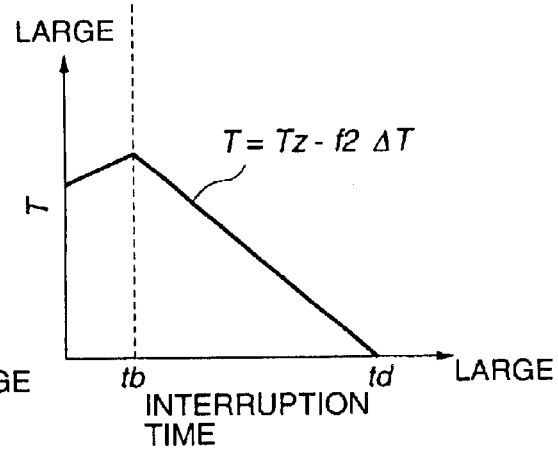

If this boundary is set as a duration tb of a state of interruption, then a predetermined value f2 is set as a negative constant from the beginning of the interruption to the elapse of the time tb, and is set as a positive constant following the elapse of the time tb, as shown in FIG. 10C. Since temperature decrease following the elapse of the time tb is more rapid than in the first phase, the predetermined value f2 following the elapse of the time tb is set at a larger value than the predetermined value f1 relating to the first phase. As shown in FIG. 10D, the elapsed time T which is calculated using the equation (3) in accordance with the predetermined value f2 increases up to the time tb and thereafter decreases. When the interruption time reaches td, the elapsed time T becomes zero.

Change in the bed temperature when regeneration processing is interrupted during the third phase may be considered identical to that during the second phase. Accordingly, a predetermined value f3 is set equally to f2.

The predetermined values f1, f2, f3 and the predetermined times tb, tc, td are dependent on the thermal capacity and thermal radiation characteristic of the DPF 41 and the exhaust gas temperature characteristic of the diesel engine 1, and are therefore determined experientially. The values of f2 and f3 must be switched according to the elapsed time from an interruption in filter regeneration. The controller 31 switches the values of f2 and f3 by counting the elapsed time from an interruption in filter regeneration.

Following the processing of the step S35 in FIG. 5, the controller 31 determines whether or not the variable PHASE equals FIRST in a step S36. If the variable PHASE equals FIRST, or in other words if the current point in time corresponds to the first phase, the values of the first phase time period t1 and second phase time period t2 are updated in a step S37. More specifically, the map having the characteristic shown in FIG. 6 is referenced and the time period t1 is recalculated to correspond to the bed temperature Tbed determined in the equation (2).

The map having the characteristic shown in FIG. 8 is then referenced to determine the amount of trapped particulate matter from the pressure loss ΔP in the DPF 41 detected by the differential pressure sensor 36, and on the basis of the amount of trapped particulate matter, the map having the characteristic shown in FIG. 7 is referenced to determine the second phase time period t2. The determined values of t1 and t2 are stored in place of the previous values of t1 and t2. Following the processing of the step S37 the controller 31 ends the subroutine.

If, as a result of the determination in the step S36, the variable PHASE does not equal FIRST, or in other words if the variable PHASE equals SECOND or THIRD, the controller 31 updates only the value of the second phase time period t2 in a step S38 using the method described above. Following the processing of the step S38, the controller 31 ends the subroutine.

By thus correcting the elapsed time T from the beginning of regeneration processing, the time period t2, and when necessary the time period t1 when regeneration processing is interrupted, the corrected values thereof can be used to perform regeneration processing when regeneration processing is restarted, and as a result temperature decreases and changes in the amount of trapped particulate matter during the interruption period are compensated for.

Referring again to FIG. 3, having set the variable PHASE in accordance with the subroutine of FIG. 5, the controller 31 determines whether or not the completion flag or interruption flag is at unity in a step S3. If any of these flags is at unity, the controller 31 ends the routine immediately. When it is determined in the step S25 of the subroutine of FIG. 5, for example, that regeneration of the DPF 41 is complete, the completion flag is set at unity in the step S29. In this case, further execution of the main routine becomes unnecessary. The step S3 is a step for ensuring that further processing is not performed in such a case.

If none of these flags is at unity, the controller 31 determines which of FIRST, SECOND, and THIRD the variable PHASE is equal to in a step S4.

If the variable PHASE is equal to FIRST, the controller 31 executes the control of the aforementioned criterion (1) in a step S5. In other words, the target value tT1 for the filter inlet temperature is set to a higher temperature than the target bed temperature tTbed, and control of the oxygen concentration in the exhaust gas is not performed. Following the processing of the step S5, the controller 31 ends the routine.

If the variable PHASE equals SECOND, the controller 31 executes the control of the aforementioned criterion (2) in steps S6 and S8. In other words, air/fuel ratio control is performed on the basis of a low level target oxygen concentration and the target value tT1 for the filter inlet temperature is maintained at the target bed temperature tTbed. Following the processing of the step S8, the controller 31 ends the routine.

If the variable PHASE equals THIRD, the controller 31 executes the control of the aforementioned criterion (3) in steps S7 and S8. In other words, air/fuel ratio control is performed on the basis of a high level target oxygen concentration and the target value tT1 for the filter inlet temperature is maintained at the target bed temperature tTbed. Following the processing of the step S8, the controller 31 ends the routine.

The specific content of the control in the criteria (1), (2), (3) will be described hereinafter.

Figure 4:
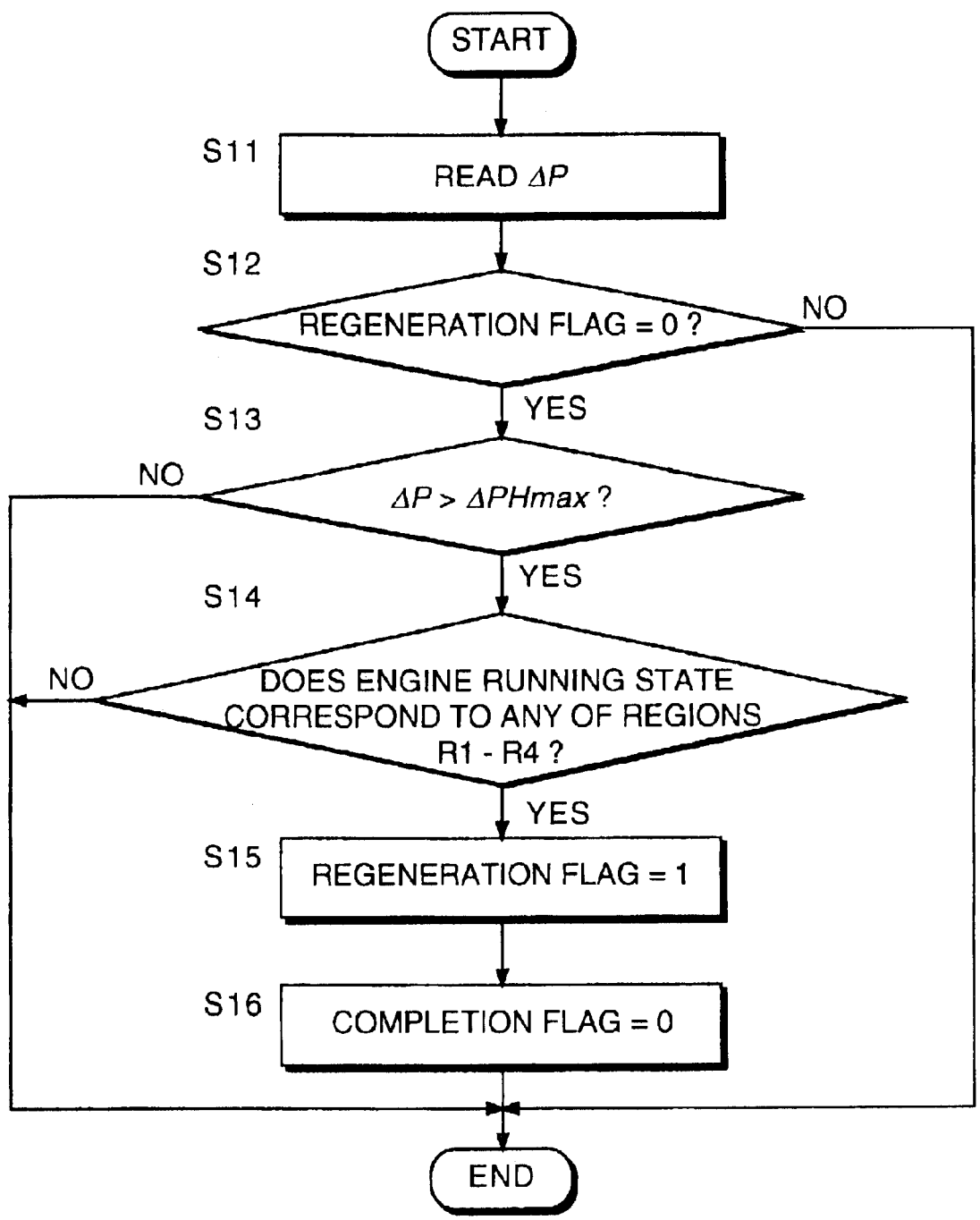
FIG. 4 is a flowchart illustrating a regeneration phase setting routine executed by the controller.

Next, referring to FIG. 4, a setting routine for the regeneration flag will be described. This routine is independent of the main routine and is executed at intervals of ten milliseconds while the diesel engine 1 is operative.

First, in a step S11, the controller 31 reads the pressure loss ΔP in the DPF 41 which is detected by the differential pressure sensor 36.

Next, in a step S12, the controller 31 determines whether or not the regeneration flag is at zero. If the regeneration flag is already set at unity, the routine is ended without performing the subsequent processing.

If the regeneration flag is not at unity, the controller 31 determines whether or not the pressure loss ΔP exceeds a regeneration start determination value ΔPHmax in a step S13.

If the pressure loss ΔP does not exceed the regeneration start determination value ΔPHmax, the routine is ended without performing the subsequent processing. If the pressure loss ΔP does exceed the regeneration start determination value ΔPHmax, the controller 31 then determines on the basis of the operating conditions of the diesel engine 1 whether or not regeneration implementation conditions for the DPF 41 have been satisfied in a step S14.

Figure 14:
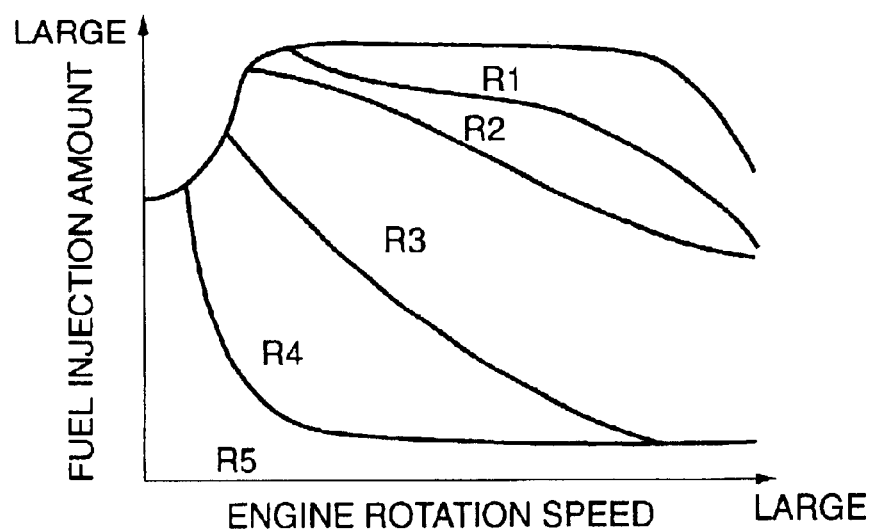
FIG. 14 is a diagram illustrating the characteristic of a fuel injection amount map which is stored by the controller.

Referring to FIG. 14, regions R1–R4 which are defined by the rotation speed of the diesel engine 1 and the fuel injection amount of the fuel nozzle 17 correspond to the regeneration implementation conditions. This type of map is stored in advance in memory in the controller 31, and in the step S14, the controller 31 determines which of the regions R1-R4 the operating conditions of the diesel engine 1 correspond to from the engine rotation speed detected by the crank angle sensor 33 and a fuel injection signal outputted to the fuel injection nozzle 17. The differences between the regions R1–R4 will be described hereinafter.

If the operating conditions of the diesel engine 1 do not correspond to any of the regions R1–R4, the controller 31 ends the routine without performing the subsequent processing. If the operating conditions of the diesel engine 1 correspond to one of the regions R1–R4, the controller 31 sets the regeneration flag to unity in a step S15, resets the completion flag to zero in a following step S16, and then ends the routine.

Figure 11:
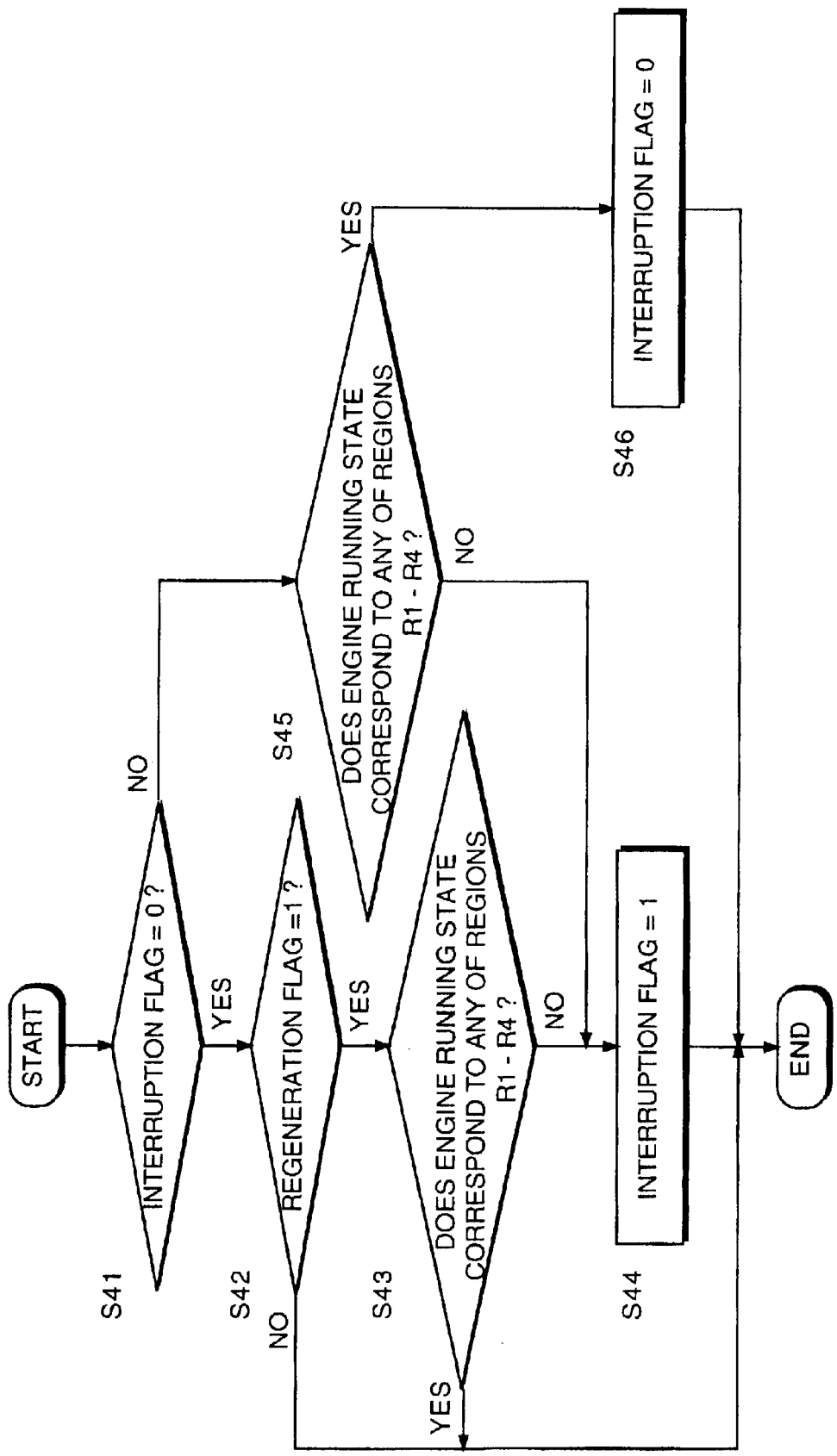
FIG. 11 is a flowchart illustrating an interruption flag setting routine executed by the controller.

Next, referring to FIG. 11, a setting routine for the interruption flag which is determined in the step S22 of FIG. 5 will be described. This routine is independent of the main routine shown in FIG. 3 and is executed at intervals of ten milliseconds.

First, in a step S41, the controller 31 determines whether or not the interruption flag is at zero. As noted above, the initial value of the interruption flag is zero.

If the interruption flag is at zero, the controller 31 determines whether or not the regeneration flag is at unity in a step S42. If the regeneration flag is at unity, the controller 31 determines whether or not the DPF 41 regeneration implementation conditions have been satisfied in a step S43. This determination is identical to that of the step S14 in FIG. 4.

If the regeneration implementation conditions have been satisfied, the controller 31 ends the routine without proceeding to the remaining steps. If the regeneration implementation conditions have not been satisfied, the controller 31 sets the interruption flag to unity in a step S44 and then ends the routine.

If, on the other hand, the interruption flag is at unity in the step S41, the controller 31 determines whether or not the regeneration implementation conditions have been satisfied in a step S45. This determination is also identical to that of the step S14 in FIG. 4.

If the regeneration implementation conditions have been satisfied in the step S45, the controller 31 resets the interruption flag to zero in a step S46 and then ends the routine. If the regeneration implementation conditions have not been satisfied in the step S45, the controller 31 sets the interruption flag to unity in the step S44 and then ends the routine.

When the interruption flag is at zero following the execution of this routine, the interruption flag is set to unity only when the regeneration processing flag is at unity and the regeneration implementation conditions are not satisfied. When the interruption flag is at unity, the interruption flag is reset to zero only when the regeneration implementation conditions are satisfied.

FIGS. 12A and 12B illustrate change in the bed temperature Tbed and the filter inlet temperature in accordance with the regeneration control of the DPF 41 executed by the controller 31. When regeneration of the DPF 41 begins, the target temperature of the filter inlet is set to the target value tT1, and the target temperature of the filter inlet is maintained at the target value tT1 until the first phase time period t1 elapses. The dot/dash line in FIG. 12B indicates actual temperature change in the filter inlet. Hence, as shown in FIG. 12A, the actual bed temperature Tbed slightly overshoots the target bed temperature tTbed and then matches the target bed temperature tTbed.

Figure 13A:
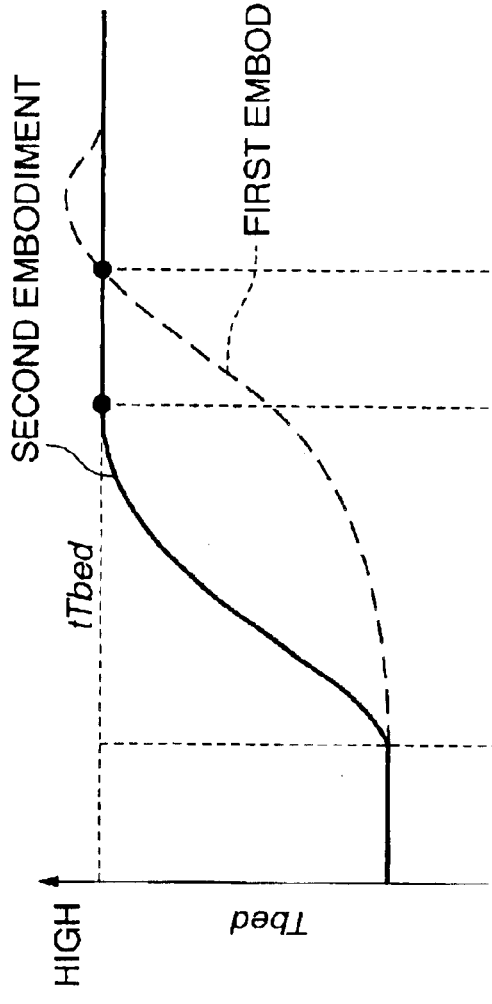
FIGS. 13A and 13B are similar to FIGS. 12A and 12B, but illustrate variations in the temperature change of the filter inlet and filter bed during regeneration processing.

Next, referring to FIGS. 13A and 13B, a second embodiment of this invention related to setting of a target temperature of the filter inlet in the first phase, or in other words pertaining to the processing content of the step S5 in the main routine of FIG. 3, will be described.

Figure 13B:
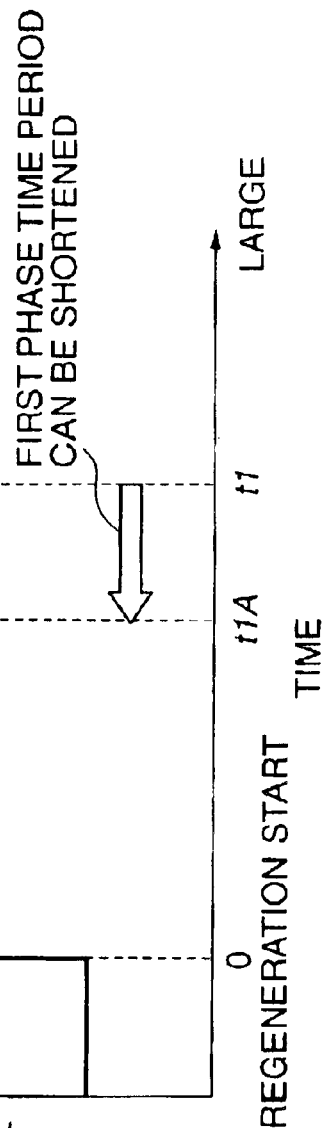

In this embodiment, as shown in FIG. 13B, the first phase is divided into a first half and a second half. In the first half, the target temperature of the filter inlet is set to a target value tT2 which is larger than the target value tT1 according to the first embodiment, and in the second half, the target temperature of the filter inlet is reduced from the target value tT2 toward the target bed temperature tTbed.

By setting the target value tT2 for the filter inlet temperature to a larger value than the target value tT1 in the first half, the rate of temperature increase of the bed temperature Tbed rises and the timing of arrival at the target bed temperature tTbed quickens, and thus the time period t1 is shortened to t1A. The target temperature tT2 of the filter inlet is reduced prior to the bed temperature Tbed reaching the target bed temperature tTbed, and hence overshoot in the bed temperature Tbed such as that shown in FIG. 12A does not arise. For comparison, the bed temperature Tbed and the target value tT1 for the filter inlet temperature according to the first embodiment shown in FIGS. 12A and 12B are illustrated in FIGS. 13A and 13B by broken lines.

Next, the specific content of the control for realizing the criteria (1), (2), (3) will be described.

In the control for realizing the criterion (1) which is executed in the step S5 of FIG. 3, the bed temperature of the DPF 41 is raised by the following method when the target value for the filter inlet temperature is either tT1 or tT2.

The temperature of the exhaust gas in the diesel engine 1 differs according to the fuel injection amount and the rotation speed. The fuel injection amount corresponds to the load of the diesel engine 1.

Referring to FIG. 14, in this invention the operating region of the diesel engine 1 is divided into five regions R1–R5, as shown in the drawing, and the bed temperature Tbed is raised to the target value tTbed by applying a different method in each region to raise the temperature of the exhaust gas.

The region R1 is in the vicinity of full load, and the exhaust gas temperature in this region has reached the target bed temperature tTbed. Accordingly, the bed temperature Tbed at the start of regeneration of the DPF 41 has reached the target value tTbed and the exhaust gas temperature does not have to be raised. The first phase time period t1 in this case is zero.

In the region R2, the engine load is smaller than in the region R1, and the bed temperature Tbed is lower than the target value tTbed. Hence the controller 31 retards the fuel injection timing of the fuel nozzle 17 to thereby raise the exhaust gas temperature of the diesel engine 1 to the target value tT1.

In the region R3, the engine load is smaller than in the region R2 and therefore the exhaust gas temperature of the diesel engine 1 cannot be raised to the target value tT1 simply by retarding the fuel injection timing of the fuel nozzle 17. In this case, the controller 31 outputs a signal to the fuel nozzle 17 such that the fuel nozzle 17 executes a post injection. A post injection is an additional injection of fuel performed during the expansion stroke of the diesel engine 1 following the regular main injection. By having the fuel nozzle 17 execute a post injection, the controller 31 raises the exhaust gas temperature to the target value tT1.

In the region R4, the engine load is smaller than in the region R3 and therefore the exhaust gas temperature of the diesel engine 1 cannot be raised to the target value tT1 simply by retarding the fuel injection timing and executing a post injection. In this case, the controller 31 opens the intake throttle 42 to increase the intake fresh air amount into the diesel engine 1, whereby the exhaust gas temperature is raised to the target value tT1.

The fuel injection amount of the post injection performed in the regions R3 and R4 is determined in the following manner.

That is, a base exhaust gas temperature Tbase is set in advance in accordance with the engine rotation speed and load (the amount of fuel in the main injection) and stored in memory in the controller 31 as a map. On the basis of the current engine rotation speed and load, the controller 31 retrieves the map and thereby determines the base exhaust gas temperature Tbase.

Figure 15:
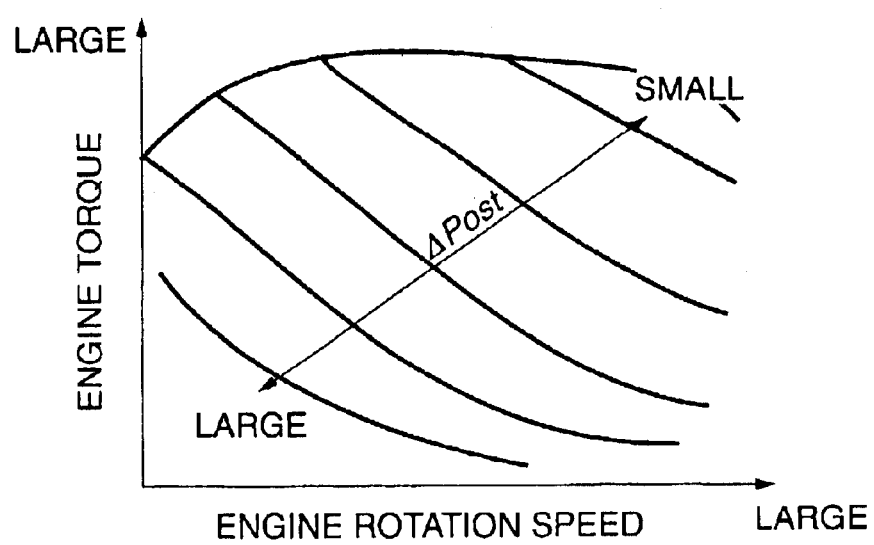
FIG. 15 is a diagram illustrating the characteristic of a map of a post injection increase amount ΔPost which is stored by the controller.

A map of a unitary post injection amount ΔPost having a characteristic as shown in FIG. 15 is also stored in advance in memory by the controller 31. The unitary post injection amount ΔPost indicates a post injection amount required to raise the exhaust gas temperature by one degree centigrade. The value of the unitary post injection amount ΔPost becomes smaller as the engine rotation speed and the engine torque increase. The controller 31 determines the unitary post injection amount ΔPost from the engine rotation speed and engine torque and calculates a post injection amount ΔQp using the following equation (4).

$$\Delta Qp = \Delta Post\ (tT1 - Tbase) \quad (4)$$

The controller 31 causes the injection nozzle 17 to inject the calculated post injection amount ΔQp at a predetermined post injection timing. Other means may be used to increase the exhaust gas temperature in the regions R3 and R4.

The diesel engine 1 comprises the variable geometric type turbocharger 21 equipped with the variable nozzle 24, and the common rail type fuel injection device 10.

When the variable nozzle 24 is opened, the workload of the turbine 22 is reduced. As a result, decreases in the temperature of the exhaust gas of the diesel engine 1 which accompany the driving of the turbine 22 are reduced such that the filter inlet temperature T1 increases.

When the pressure of the common rail 16 is reduced, the injection period of the fuel nozzle 17 lengthens in order to maintain an identical injection amount. As a result, combustion deteriorates and the engine torque decreases, and thus the fuel injection amount rises in order to compensate for the decrease in torque. This results in an increase in the filter inlet temperature T1.

The region R5 is a region in which the exhaust gas temperature is low by nature such as an idling state. In this region the filter inlet temperature T1 cannot be raised to the target value tT1 using any of the aforementioned methods. Hence in the region R5, regeneration implementation conditions are determined to be unsatisfied as noted above and regeneration of the DPF 41 is not performed.

Next, the control performed to realize the criterion (2) which is executed in the step S6 of FIG. 5 and the control performed to realize the criterion (3) which is executed in the step S7 of FIG. 5 will be described.

Figure 16:
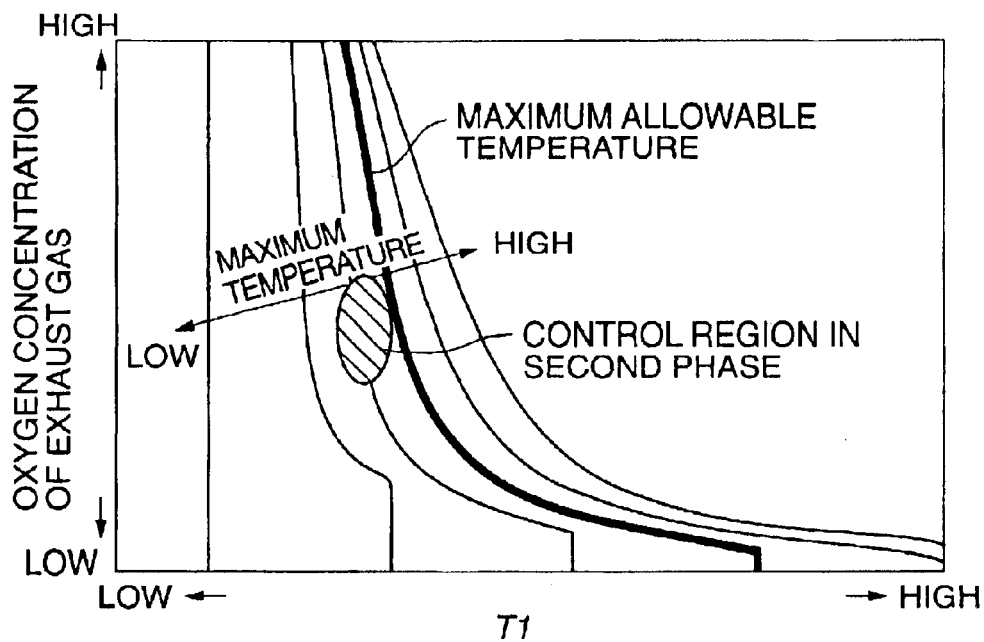
FIG. 16 is a diagram showing a relationship between the exhaust gas temperature at the filter inlet, exhaust gas oxygen concentration, and maximum filter bed temperature during filter regeneration processing when the amount of particulate matter trapped in the filter is large.
Figure 17:
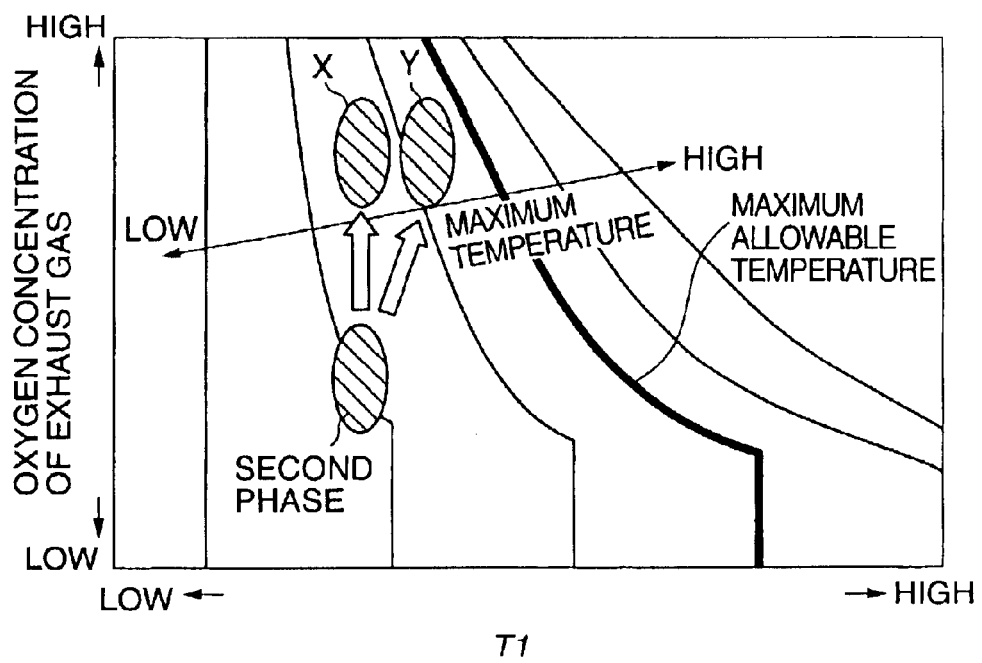
FIG. 17 is similar to FIG. 16, but illustrates a case in which the amount of particulate matter trapped in the filter is small.

The exhaust gas temperature at the inlet of the DPF 41, the oxygen concentration of the exhaust gas, and the maximum bed temperature of the DPF 41 are related in accordance with the amount of trapped particulate matter in the DPF 41 as shown in FIG. 16 or FIG. 17.

In the second phase, the amount of trapped particulate matter is large and the relationship of FIG. 16 is present. If the oxygen concentration of the exhaust gas is high when the amount of trapped particulate matter is large, the combustion rate of the particulate matter is large, and due to the rapid combustion of the particulate matter the bed temperature of the DPF 41 rises excessively. In the drawing, the gaps between the curved lines indicating the maximum bed temperature of the DPF 41 are narrow, and this indicates that the bed temperature reacts sensitively to the oxygen concentration of the exhaust gas.

In order to prevent the maximum bed temperature from exceeding the maximum allowable temperature Tmax, which is indicated by the bold line in the drawing, the target oxygen concentration of the exhaust gas must be suppressed to a low level such as that shown by the shaded area in the drawing. The shaded area in the drawing corresponds to approximately 1.5 when converted into an excess air factor λ of the diesel engine 1. The shaded area in the drawing is provided with a slight width in consideration of control delays when the diesel engine 1 is in a transient state and irregularities in the control precision.

In the third phase, the amount of trapped particulate matter is small as a result of the particulate matter combustion in the second phase, and thus the exhaust gas temperature at the inlet of the DPF 41, the oxygen concentration of the exhaust gas, and the maximum bed temperature of the DPF 41 have the relationship shown in FIG. 17. In this case, the target oxygen concentration may be set higher than the target oxygen concentration in the second phase, as shown by a region X in the drawing. By increasing the target oxygen concentration, the combustion rate of the particulate matter is increased, and thus the remaining particulate matter may be burned up in a short period of time.

Further, as shown by a region Y in the drawing, the bed temperature does not exceed the maximum allowable temperature Tmax even when the target value tT1 for the filter inlet temperature is increased beyond the target bed temperature tTbed. If the target value tT1 for the filter inlet temperature is set in this manner, the time required for regeneration processing of the DPF 41 can be reduced, thereby enhancing regeneration efficiency.

Figure 18:
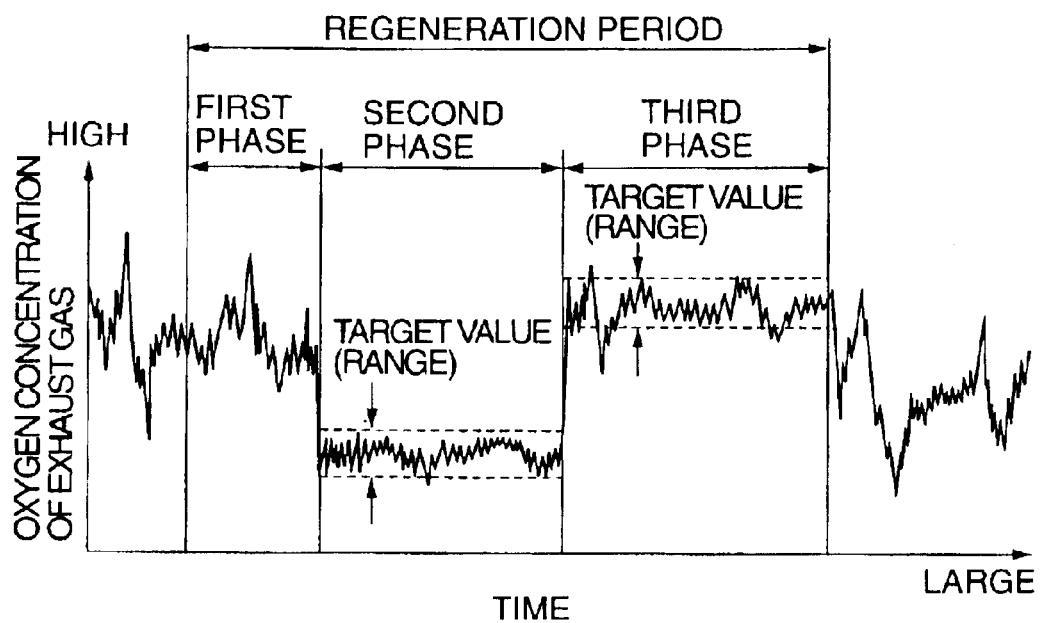
FIG. 18 is a timing chart illustrating the setting of a target exhaust gas oxygen concentration according to this invention.

When the exhaust gas oxygen concentration is controlled with the target oxygen concentration set as described above, the actual oxygen concentration changes as shown in FIG. 18. Oxygen concentration is not controlled outside of the second and third phases, and thus outside of the second and third phases the exhaust gas oxygen concentration varies greatly in accordance with the vehicle running conditions such as acceleration and deceleration.

Figure 19:
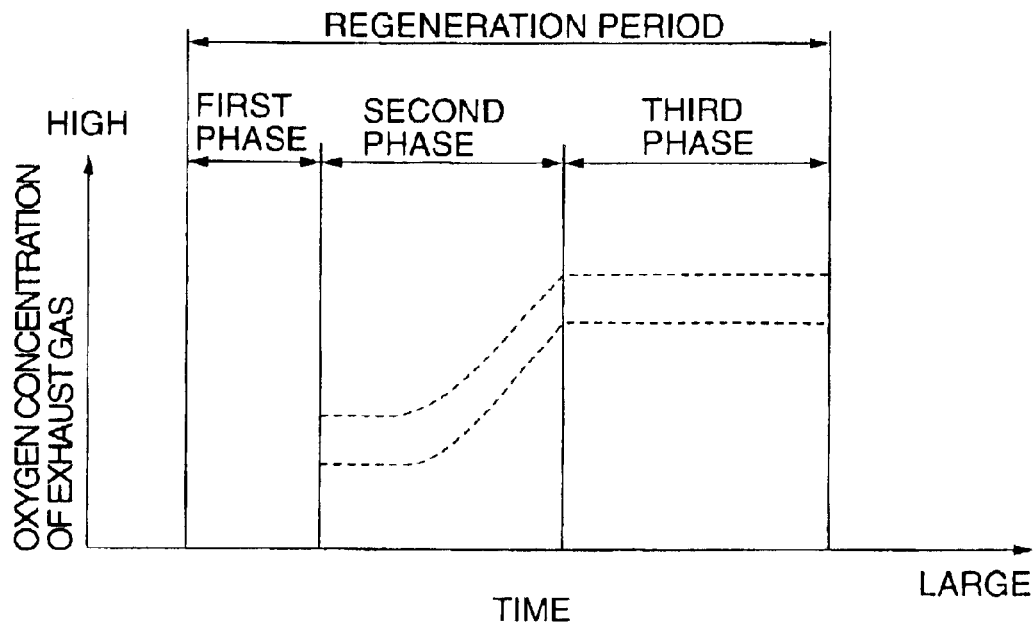
FIG. 19 is similar to FIG. 18, but illustrates a variation in the setting of the target oxygen concentration.

FIG. 18 shows changes in the actual oxygen concentration when the target oxygen concentration is set to a low concentration in the first phase and to a high concentration in the third phase. As shown in FIG. 19, however, it is preferable that the target oxygen concentration in the second half of the second phase be caused to gradually increase toward the target oxygen concentration of the third phase in accordance with the decrease in the amount of trapped particulate matter.

A specific control method for the oxygen concentration will now be described.

When the target oxygen concentration of the exhaust gas in the diesel engine 1 is set as tRO2(%), and a corresponding target excess air factor is set as tλ, the following equation (5) is established.

$$t\lambda = \frac{21}{21 - tRO2} \quad (5)$$

21 in the equation (5) is the oxygen concentration (%) of air.

The target excess air factor tλ is reached by controlling the intake fresh air amount of the diesel engine 1 or by controlling the fuel injection amount.

First, control of the intake fresh air amount will be described.

When an intake fresh air amount for attaining the target excess air factor tλ in the equation (5) is set as tQa and the fuel injection amount is set as Qf, the following equation (6) is established.

$$tQa = Qf \cdot \text{stoichiometric air/fuel ratio} \cdot t\lambda \quad (6)$$

By inserting the equation (5) into the equation (6), the following equation (7) is obtained.

$$tQa = Qa \cdot \text{stoichiometric air/fuel ratio} \cdot \frac{21}{21 - tRO2} \quad (7)$$

The controller 31 controls the intake fresh air amount of the diesel engine 1 to the target intake fresh air amount tQa obtained in the equation (7).

Control of the intake fresh air amount is performed by increasing or decreasing any one of the opening of the variable nozzle 24 of the turbocharger 21, the opening of the EGR valve 6, and the opening of the intake throttle 42 in accordance with the operating region of the diesel engine 1.

Figure 20:
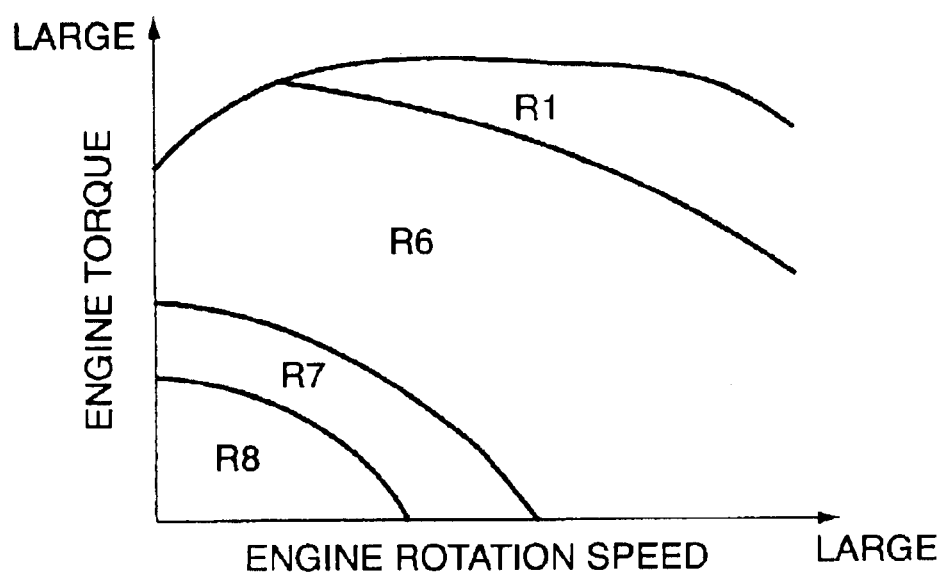
FIG. 20 is a diagram illustrating change in the intake fresh air amount of the engine in accordance with the engine rotation speed and engine torque.

Referring to FIG. 20, of operating regions R1, R6–R8 of the diesel engine 1 which are defined by the engine rotation speed and the engine torque, in the regions R6–R8 the intake fresh air amount can be controlled by the opening of the variable nozzle 24 of the turbocharger 21. In the operating region R1 of the drawing, the DPF 41 is regenerated naturally without performing regeneration control.

When the opening of the variable nozzle 24 is reduced, the rotation speed of the turbine 22 rises and the intake fresh air amount increases. When the opening of the variable nozzle 24 is increased, the rotation speed of the turbine 22 falls and the intake fresh air amount decreases.

In the operating regions R7 and R8, the intake fresh air amount may be controlled by the opening of the EGR valve 6.

When the opening of the EGR valve 6 is increased, the EGR amount increases and the intake fresh air amount decreases relatively thereto. When the opening of the EGR valve 6 is decreased, the EGR amount decreases and the intake fresh air amount increases relatively thereto.

In the operating region R8, the intake fresh air amount may be controlled by the opening of the intake throttle 42.

If the opening of the intake throttle 42 is decreased, the intake fresh air amount decreases, and if the opening of the intake throttle 42 is increased, the intake fresh air amount increases.

Control of the fuel injection amount is performed by having the controller 31 control the period and timing of fuel injection from the fuel nozzle 17.

When a target fuel injection amount for obtaining the target excess air factor tλ of the equation (5) is set as tQf and the intake fresh air amount is set as Qa, the following equation (8) is established.

$$Qa = tQf \cdot \text{stoichiometric air/feul ratio} \cdot t\lambda \quad (8)$$

By solving the equations (5) and (8) for the target fuel injection amount tQf, the following equation (9) is obtained.

$$tQf = Qa \cdot \frac{1}{\text{stoichiometric air/fuel ratio}} \cdot \frac{21 - tRO2}{21} \quad (9)$$

The controller 31 controls the fuel injection nozzle 17 such that the target fuel injection amount tQf calculated in the equation (9) is obtained.

Figure 21:
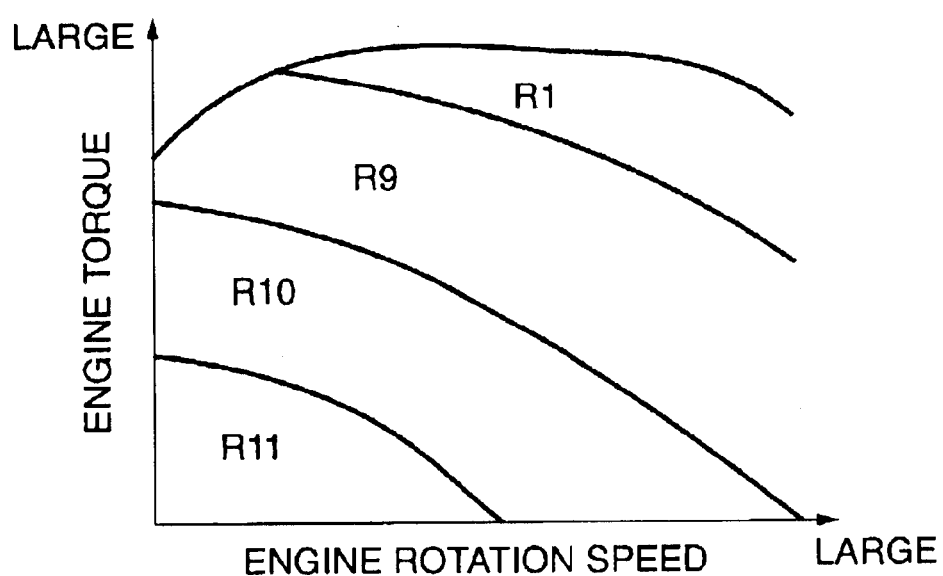
FIG. 21 is a diagram illustrating change in the fuel injection timing of the engine in accordance with the engine rotation speed and engine torque.

Referring to FIG. 21, the control method for the fuel injection nozzle 17 in order to achieve the target fuel injection amount tQf differs according to the operating region of the diesel engine 1 defined by the engine rotation speed and engine torque. In the operating region R1 in the drawing, the DPF 41 is regenerated naturally without performing regeneration control In the operating region R9 in the drawing, the controller 31 retards the main injection timing of the fuel nozzle 17 and causes the main injection amount to match the target fuel injection amount tQf.

In the operating region R10 in the drawing, the controller 31 causes the fuel nozzle 17 to execute a main injection and a post injection. The method of determining the main injection amount and post injection amount in this case is as follows.

A post injection is performed during the expansion stroke of the diesel engine 1, and therefore the effect thereof on the engine torque is small. Hence a fuel injection amount corresponding to the engine torque is injected in the main injection and the difference between the target fuel injection amount tQf and the main injection amount is injected in the post injection.

In the operating region R11 in the drawing, the controller 31 causes the fuel nozzle 17 to execute a main injection and a post injection and also operates the intake throttle 42. When the opening of the intake throttle 42 is decreased, pumping loss accompanying the air increases. In order to compensate for this loss, the post injection amount may be increased. The timing of the main injection in this case is advanced beyond that during normal operations when control of the exhaust gas oxygen concentration is not performed.

The contents of Tokugan 2002-189206 with a filing date of Jun. 28, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, control of the intake fresh air amount and fuel injection amount as described above is performed in both cases by open loop control, but feedback control may also be applied to this control. That is, the opening of the variable nozzle 24, the EGR valve 6, or the intake throttle 42 is controlled such that the intake fresh air amount detected by the air flow meter 35 matches the target intake fresh air amount tQa of the equation (7).

Similarly, the lifting period of the fuel nozzle 17 is feedback controlled such that the actual fuel injection amount matches the target fuel injection amount tQf of the equation (9).

The embodiments of this invention in which an exclusive property or privilege is claimed are defined as follows:

What is claimed is:

1. A regeneration device for a filter which traps particulate matter contained in the exhaust gas of an internal combustion engine, the particulate matter burning at a predetermined temperature, the device comprising:
    an exhaust gas temperature adjustment mechanism which regulates a temperature of the exhaust gas;
    an exhaust gas oxygen concentration adjustment mechanism which regulates an oxygen concentration of the exhaust gas;
    a sensor which detects a temperature of the filter; and
    a controller functioning to:
        control the exhaust gas temperature adjustment mechanism in a first phase such that the exhaust gas temperature is raised until the temperature of the filter rises to a predetermined temperature;
        control the exhaust gas oxygen concentration adjustment mechanism in a second phase following the first phase to cause the oxygen concentration of the exhaust gas to be held at a first target concentration while controlling the exhaust gas temperature adjustment mechanism to cause the temperature of the filter to be maintained at the predetermined temperature; and
        control the exhaust gas oxygen concentration adjustment mechanism in a third phase following the second phase to cause the oxygen concentration of the exhaust gas to be held at a second target concentration which is higher than the first target concentration while controlling the exhaust gas temperature adjustment mechanism to cause the temperature of the filter to be maintained at the predetermined temperature.

2. The regeneration device as defined in claim 1, wherein the controller further functions to set the duration of the first phase to be shorter as the filter temperature at the start of the first phase increases.

3. The regeneration device as defined in claim 1, wherein the regeneration device further comprises a sensor which detects an amount of trapped particulate matter in the filter, and the controller further functions to set the duration of the first phase to be longer as the amount of trapped particulate matter in the filter at the start of the first phase increases.

4. The regeneration device as defined in claim 1, wherein the controller further functions to set the duration of the first phase to zero when the amount of trapped particulate matter in the filter at the start of the first phase does not reach a predetermined amount.

5. The regeneration device as defined in claim 4, wherein the predetermined amount is set on the basis of an amount of trapped particulate matter at the start of the second phase which is sufficient such that the temperature of the filter is not caused to exceed a maximum allowable temperature when the trapped particulate matter burns during the second phase.

6. The regeneration device as defined in claim 1, wherein the controller further functions to set a target temperature for the exhaust gas temperature at an inlet of the filter in the first phase to a higher temperature than the predetermined temperature, and to control the exhaust gas temperature adjustment mechanism on the basis of the target temperature.

7. The regeneration device as defined in claim 6, wherein the controller further functions to gradually decrease the target temperature for the exhaust gas temperature at the inlet of the filter in the first phase toward the predetermined temperature after setting the target temperature to a higher temperature than the predetermined temperature.

8. The regeneration device as defined in claim 1, wherein the exhaust gas temperature adjustment mechanism comprises a fuel injection nozzle which injects fuel for combustion into the internal combustion engine, and the controller further functions to raise the exhaust gas temperature by retarding a fuel injection timing of the fuel injection nozzle.

9. The regeneration device as defined in claim 1, wherein the exhaust gas temperature adjustment mechanism comprises a fuel injection nozzle which injects fuel for combustion into the internal combustion engine through a main injection, and the controller further functions to raise the exhaust gas temperature by causing the fuel injector to perform a post injection following the main injection.

10. The regeneration device as defined in claim 1, wherein the exhaust gas temperature adjustment mechanism comprises a fuel injection nozzle which injects fuel for combustion into the internal combustion engine through a main injection and an intake throttle which regulates an intake fresh air amount of the internal combustion engine, and the controller further functions to raise the exhaust gas temperature by causing the fuel injection nozzle to perform a post injection following the main injection while causing the intake throttle to increase the intake fresh air amount.

11. The regeneration device as defined in claim 1, wherein the filter is provided on an exhaust passage of the internal combustion engine, the exhaust gas temperature adjustment mechanism comprises a turbocharger which boosts a charge amount of an intake fresh air of the internal combustion engine using an exhaust gas pressure in the exhaust passage, the turbocharger performing pressure charging in accordance with the rotation of a turbine which is provided in the exhaust passage upstream of the filter and operated by exhaust gas pressure, the turbine comprising a variable nozzle for adjusting a workload thereof, and the controller further functions to raise the exhaust gas temperature by causing the variable nozzle to reduce the workload of the turbine.

12. The regeneration device as defined in claim 1, wherein the exhaust gas temperature adjustment mechanism comprises a common rail type fuel injection device which supplies fuel for combustion to the internal combustion engine under a predetermined pressure, and the controller further functions to raise the exhaust gas temperature by causing the common rail type fuel injection device to reduce the fuel supply pressure.

13. The regeneration device as defined in claim 1, wherein the controller, further functions, in the second phase, to control the exhaust gas oxygen concentration adjustment mechanism to cause the oxygen concentration of the exhaust gas to gradually increase toward the second target concentration, after controlling the exhaust gas oxygen concentration adjustment mechanism to cause the oxygen concentration of the exhaust gas to be held at the first target concentration.

14. The regeneration device as defined in claim 1, wherein the exhaust gas oxygen concentration adjustment mechanism comprises an intake fresh air amount adjustment mechanism which adjusts an intake fresh air amount of the internal combustion engine.

15. The regeneration device as defined in claim 14, wherein the internal combustion engine comprises a turbocharger which boosts a charge amount of an intake fresh air of the internal combustion engine according to a boost pressure, and the intake fresh air amount adjustment mechanism comprises a variable geometry system which regulates the boost pressure of the turbocharger.

16. The regeneration device as defined in claim 14, wherein the intake fresh air amount adjustment mechanism comprises an exhaust gas recirculation valve which recirculates a part of the exhaust gas into an intake air of the internal combustion engine.

17. The regeneration device as defined in claim 14, wherein the intake fresh air amount adjustment mechanism comprises an intake throttle which regulates an intake fresh air amount of the internal combustion engine.

18. The regeneration device as defined in claim 1, wherein the exhaust gas oxygen concentration adjustment mechanism comprises a fuel injection nozzle which injects fuel for combustion into the internal combustion engine.

19. The regeneration device as defined in claim 18, wherein the controller further functions to cause the fuel injection nozzle to inject fuel for combustion in a main injection, and to perform a post injection to regulate the oxygen concentration of the exhaust gas.

20. The regeneration device as defined in claim 19, wherein the exhaust gas oxygen concentration adjustment mechanism further comprises an intake throttle which regulates an intake fresh air amount of the internal combustion engine, according to an opening and the controller further functions to regulate the oxygen concentration of the exhaust gas by adjusting an amount of the post injection of the fuel injection nozzle and the opening of the intake throttle.

21. The regeneration device as defined in claim 1, wherein the controller further functions to determine that the first phase is complete when an elapsed time from a start of the first phase reaches a predetermined duration.

22. The regeneration device as defined in claim 1, wherein the controller further functions to determine that the second phase is complete when an elapsed time from a start of the second phase reaches a predetermined duration.

23. The regeneration device as defined in claim 1, wherein the controller further functions to determine that the third phase is complete when an elapsed time from a start of the third phase reaches a predetermined duration.

24. The regeneration device as defined in claim 1, wherein the controller further functions to determine whether or not a predetermined regeneration implementation condition is satisfied, and to interrupt control of the exhaust gas temperature adjustment mechanism and the exhaust gas oxygen concentration adjustment mechanism when the predetermined regeneration implementation is not satisfied.

25. The regeneration device as defined in claim 24, wherein the controller further functions to restart controlling the exhaust gas temperature adjustment mechanism and the exhaust gas oxygen concentration adjustment mechanism when the regeneration implementation condition is satisfied after an interruption of control of the exhaust gas temperature adjustment mechanism and the exhaust gas oxygen concentration adjustment mechanism.

26. The regeneration device as defined in claim 24, wherein the controller further functions to interrupt control of the exhaust gas temperature adjustment mechanism when the regeneration implementation is no longer satisfied in the first phase, to restart controlling the exhaust gas temperature adjustment mechanism when the regeneration implementation condition is satisfied after an interruption of control of the exhaust gas temperature adjustment mechanism in the first phase, while setting a duration of the first phase after a restart of control to be shorter as the temperature of the filter at the restart of control increases, and determining that the first phase is complete when an elapsed time from the restart of the control reaches the duration of the first phase after the restart of control.

27. The regeneration device as defined in claim 26, wherein the regeneration device further comprises a sensor which detects an amount of trapped particulate matter in the filter, and the controller further functions to set a duration of the second phase to be longer as the amount of trapped particulate matter upon the restart of control in the first phase increases, and to determine that the second phase is complete when an elapsed time from a start of the second phase reaches the duration of the second phase.

28. The regeneration device as defined in claim 24, wherein the regeneration device further comprises a sensor which detects an amount of trapped particulate matter in the filter, and the controller further functions to interrupt control of the exhaust gas temperature adjustment mechanism and the exhaust gas oxygen concentration adjustment mechanism when the regeneration implementation condition is no longer satisfied in the second phase, to restart controlling the exhaust gas temperature adjustment mechanism and the exhaust gas oxygen concentration adjustment mechanism when the regeneration implementation is satisfied after an interruption of control of the exhaust gas temperature adjustment mechanism and the exhaust gas oxygen concentration adjustment mechanism in the second phase, while setting a duration of the second phase after a restart of control to be longer as the amount of trapped particulate matter in the filter at the restart of control increases, and determining that the second phase is complete when an elapsed time from the restart of control reaches the duration of the second phase after the restart of control.

29. The regeneration device as defined in claim 24, wherein the controller further functions to determine completion of the first phase, completion of the second phase, and completion of the third phase on the basis of an elapsed time from a start of the first phase, and when the regeneration implementation is no longer satisfied, functions to correct the elapsed time from the start of the first phase in a decreasing direction as an amount of time for which the regeneration implementation is not satisfied lengthens.

30. The regeneration device as defined in claim 24, wherein the controller further functions to determine completion of the first phase, completion of the second phase, and completion of the third phase on the basis of an elapsed time from a start of the first phase, and functions, when the regeneration implementation is no longer satisfied in either of the second phase and the third phase, to correct the elapsed time from the start of the first phase in an increasing direction until an amount of time for which the regeneration implementation condition is not satisfied reaches a predetermined time, and to correct the elapsed time from the start of the first phase in a decreasing direction after the amount of time for which the regeneration implementation is not satisfied has exceeded the predetermined time.

31. A regeneration device for a filter which traps particulate matter contained in the exhaust gas of an internal combustion engine, the particulate matter burning at a predetermined temperature, the device comprising:

means for regulating a temperature of the exhaust gas;

means for regulating an oxygen concentration of the exhaust gas;

means for detecting a temperature of the filter; and means for controlling the exhaust gas temperature adjustment mechanism in a first phase such that the exhaust gas temperature is raised until the temperature of the filter rises to a predetermined temperature;

means for controlling the exhaust gas oxygen concentration adjustment mechanism in a second phase following the first phase to cause the oxygen concentration of the exhaust gas to be held at a first target concentration while controlling the exhaust gas temperature adjustment mechanism to cause the temperature of the filter to be maintained at the predetermined temperature; and means for controlling the exhaust gas oxygen concentration adjustment mechanism in a third phase following the second phase to cause the oxygen concentration of the exhaust gas to be held at a second target concentration which is higher than the first target concentration while controlling the exhaust gas temperature adjustment mechanism to cause the temperature of the filter to be maintained at the predetermined temperature.

32. A regeneration method for a filter which traps particulate matter contained in the exhaust gas of an internal combustion engine, wherein the particulate matter burns at a predetermined temperature, and the engine comprises an exhaust gas temperature adjustment mechanism which regulates a temperature of the exhaust gas, an exhaust gas oxygen concentration adjustment mechanism which regulates an oxygen concentration of the exhaust gas and a sensor which detects a temperature of the filter, the method comprising:

controlling the exhaust gas temperature adjustment mechanism in a first phase such that the exhaust gas temperature is raised until the temperature of the filter rises to a predetermined temperature;

controlling the exhaust gas oxygen concentration adjustment mechanism in a second phase following the first phase to cause the oxygen concentration of the exhaust gas to be held at a first target concentration while controlling the exhaust gas temperature adjustment mechanism to cause the temperature of the filter to be maintained at the predetermined temperature; and controlling the exhaust gas oxygen concentration adjustment mechanism in a third phase following the second phase to cause the oxygen concentration of the exhaust gas to be held at a second target concentration which is higher than the first target concentration while controlling the exhaust gas temperature adjustment mechanism to cause the temperature of the filter to be maintained at the predetermined temperature.

* * * * *